United States Patent
Rizkalla et al.

(10) Patent No.: US 9,328,669 B2
(45) Date of Patent: May 3, 2016

(54) DYNAMIC AND AUTOMATIC TUNING OF A GAS TURBINE ENGINE USING EXHAUST TEMPERATURE AND INLET GUIDE VANE ANGLE

(71) Applicants: Hany Rizkalla, Stuart, FL (US); Donald Gauthier, Jupiter, FL (US); Peter John Stuttaford, Jupiter, FL (US); Sumit Soni, Jupiter, FL (US)

(72) Inventors: Hany Rizkalla, Stuart, FL (US); Donald Gauthier, Jupiter, FL (US); Peter John Stuttaford, Jupiter, FL (US); Sumit Soni, Jupiter, FL (US)

(73) Assignee: Alstom Technology Ltd, Baden (CH)

( * ) Notice: Subject to any disclaimer, the term of this patent is extended or adjusted under 35 U.S.C. 154(b) by 109 days.

(21) Appl. No.: 14/213,263

(22) Filed: Mar. 14, 2014

(65) Prior Publication Data

US 2015/0267620 A1   Sep. 24, 2015

Related U.S. Application Data

(60) Provisional application No. 61/790,161, filed on Mar. 15, 2013.

(51) Int. Cl.
| | |
|---|---|
| *F02C 9/22* | (2006.01) |
| *G05B 15/02* | (2006.01) |
| *F02C 9/00* | (2006.01) |
| *F02C 9/48* | (2006.01) |

(52) U.S. Cl.
CPC ... *F02C 9/22* (2013.01); *F02C 9/00* (2013.01); *F02C 9/48* (2013.01); *G05B 15/02* (2013.01); *F05D 2260/964* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,584,171 A | * | 12/1996 | Sato | F02C 9/50 60/39.27 |
| 7,269,953 B2 | * | 9/2007 | Gadde | F01D 17/162 60/39.27 |
| 7,469,545 B2 | * | 12/2008 | Riley | B64D 41/00 244/53 B |
| 8,437,941 B2 | * | 5/2013 | Chandler | F02C 9/28 290/52 |
| 9,097,185 B2 | * | 8/2015 | Demougeot | F02C 7/228 |
| 2005/0050901 A1 | * | 3/2005 | Little | F01D 5/08 60/785 |
| 2007/0214795 A1 | * | 9/2007 | Cooker | F02K 1/06 60/772 |
| 2012/0023953 A1 | * | 2/2012 | Thomas | F02C 7/228 60/772 |
| 2013/0066615 A1 | * | 3/2013 | Morgan | G05B 13/048 703/7 |
| 2013/0073170 A1 | * | 3/2013 | Drohan | F01D 17/08 701/100 |
| 2014/0020400 A1 | * | 1/2014 | Ceccherini | F02C 9/54 60/773 |
| 2015/0142188 A1 | * | 5/2015 | Terry | G05B 15/02 700/287 |
| 2015/0185716 A1 | * | 7/2015 | Wichmann | F01K 23/101 700/287 |

* cited by examiner

*Primary Examiner* — Edward J Pipala
(74) *Attorney, Agent, or Firm* — Shook, Hardy & Bacon, L.L.P.

(57) ABSTRACT

Methods and systems are provided for dynamically auto-tuning a gas turbine engine. Initially, parameters of the gas turbine engine are monitored to determine that they are within predefined upper and lower limits such that a margin exists. A first incremental adjustment of an inlet guide vane (IGV) angle is performed. If the monitored parameters are still within the predefined upper and lower limits, a second incremental adjustment of the IGV angle is performed. It is determined that the monitored parameters are still within the predefined upper and lower limits. Additionally, it is determined that a predefined value of the IGV angle has been reached such that the IGV angle is not to be further increased or decreased.

21 Claims, 17 Drawing Sheets

| Exemplary Tuning Sequence Table ||
|---|---|
| Description | Parameter |
| Tune(1) | Lean Blowout |
| Tune(2) | Cold Tone |
| Tune(3) | Low NOx |
| Tune(4) | Hot Tone |
| Tune(5) | High Hot Tone |
| Tune(6) | High NOx |
| Tune(7) | Carbon Monoxide |
| Tune(8) | Lean Blowout to Hot Tone |

DYNAMIC AND AUTOMATIC TUNING OF A GAS TURBINE ENGINE USING EXHAUST TEMPERATURE AND INLET GUIDE VANE ANGLE

CROSS-REFERENCE TO RELATED APPLICATIONS

This application claims priority to U.S. Provisional Application Ser. No. 61/790,161, filed Mar. 15, 2013, entitled "Dynamic Auto-Tuning of a Gas Turbine Engine," and is incorporated by reference herein in its entirety.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

SUMMARY

Increasingly, a control system is used to regulate the operation of the gas turbine engine. In operation, the control system receives a plurality of indications that communicate the current operating conditions of the gas turbine engine including pressures, temperatures, fuel-flow rates, and engine frequencies. In response, the control system makes adjustments to the inputs of the gas turbine engine, thereby changing performance of the gas turbine engine. Over time, this performance may fall outside a preferred operating range due to mechanical degradation of the gas turbine engine or changes in operational conditions, such as ambient temperature or fuel constituents. For instance, the gas turbine engine may start operating beyond regulated emissions limits. As such, multiple manual tunings are required to update the control system. Manual tuning is labor intensive and can create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during those windows will capture those benefits typically missed with manual tuning.

Initially, various engine operating conditions can be monitored. By way of example, these operating conditions may include, but are not limited to, emissions, and combustor dynamics modes, such as lean blowout (LBO), cold tone (CT), low NOx (LoNX), hot tone (HT), high hot tone (HHT), high NOx (HiNX), carbon monoxide (CO), the ratio of lean blowout to hot tone (LBOtoHT), and screech. In embodiments, a combination of parameters is monitored.

In one embodiment, the operating conditions or parameters of the gas turbine engine, such as those mentioned above, are monitored while one or more conditions of the engine are being incrementally adjusted. For example, a temperature (e.g., exhaust temperature or firing temperature) or an inlet guide vane (IGV) angle of the engine may be adjusted in small increments. After each adjustment, the parameters being monitored may continue to be monitored to determine that each is measuring between an upper and lower predefined limit. If the values of the parameters stay within the upper and lower boundaries, the temperature or IGV angle may continue to be adjusted in a particular direction. In one instance, this achieves maximization of power of the gas turbine engine. For example, by knowing the margin available of at least one of the monitored parameters, it can be determined by how much the IGV angle can be adjusted to increase power. To ensure that the parameters stay within the predefined boundaries, the IGV angle may be slowly adjusted in a particular direction while the parameters are closely monitored. This maximizes power output while maintaining emissions and dynamics within the predefined limits.

Additional advantages and features of the present invention will be set forth in part in a description which follows, and in part will become apparent to those skilled in the art upon examination of the following, or may be learned from practice of the invention. Embodiments of the present invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIGS. 11-16 illustrate exemplary screen shots of an auto-tune system for adjusting an operation condition of a gas turbine engine based on one or more monitored parameters, in accordance with an embodiment of the present invention;

DETAILED DESCRIPTION

Figure 1:
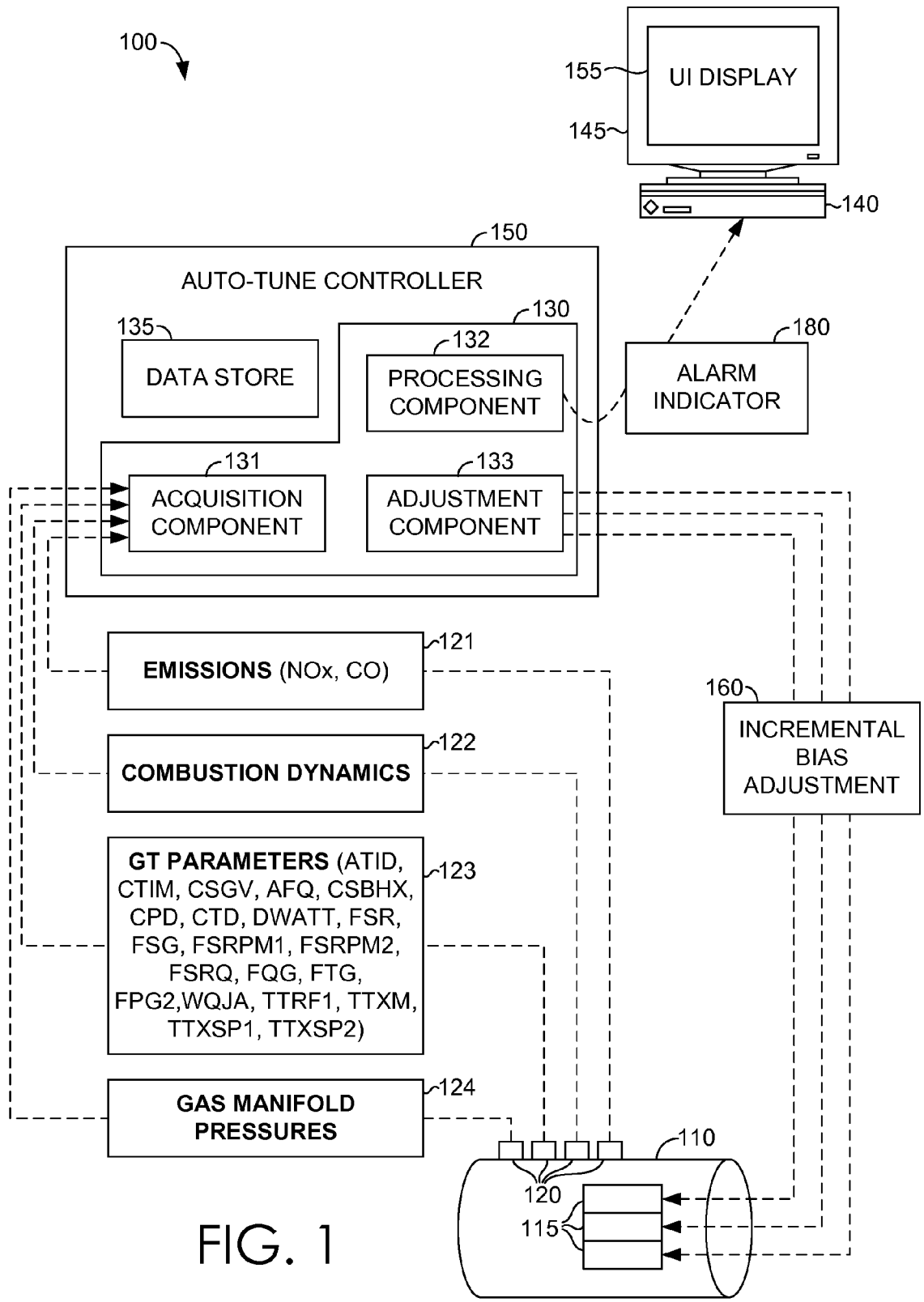
FIG. 1 is a block diagram of an exemplary tuning environment suitable for use in embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things, a method, a system, or a computer-program product. Accordingly, the embodiments may take the form of a hardware embodiment, a software embodiment, or an embodiment combining software and hardware. In one instance, embodiments of the present invention take the form of the computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVDs), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

One aspect of the present invention is directed to one or more computer-readable media that, when invoked by computer-executable instructions, perform a method for dynamically auto-tuning a gas turbine engine. The method includes monitoring one or more parameters of the gas turbine engine during operation, determining that the one or more monitored parameters of the gas turbine engine are within predetermined upper and lower limits such that a margin exists for the one or more monitored parameters, and performing a first incremental adjustment of an inlet guide vane (IGV) angle of the gas turbine engine. Further, the method includes, upon performing the first incremental adjustment of the IGV angle, determining that the one or more monitored parameters of the gas turbine engine are still within the predetermined upper and lower limits, and performing a second incremental adjustment of the IGV angle of the gas turbine engine. Additionally, the method includes, upon performing the second incremental adjustment of the IGV angle, determining that the one or more monitored parameters of the gas turbine engine are still within the predetermined upper and lower limits, and determining that a predetermined value of the IGV angle has been reached such that the IGV angle is not to be further increased or decreased.

Another aspect is directed to one or more computer-readable media that, when invoked by computer-executable instructions, perform a method for dynamically auto-tuning a gas turbine engine. The method includes monitoring one or more parameters of the gas turbine engine during operation, determining that the one or more monitored parameters of the gas turbine engine are within predetermined upper and lower limits, and making a first incremental adjustment of an exhaust temperature of the gas turbine engine, wherein adjusting the exhaust temperature results in an adjustment of fuel flow into the gas turbine engine. Furthermore, the method includes, upon making the first incremental adjustment of the exhaust temperature, determining that the one or more monitored parameters of the gas turbine engine are still within the predetermined upper and lower limits, and making a second incremental adjustment of the exhaust temperature. The method additionally includes, upon making the second incremental adjustment of the exhaust temperature, determining that the one or more monitored parameters of the gas turbine engine are still within the predetermined upper and lower limits, and determining that a predetermined value of the exhaust temperature has been reached such that the exhaust temperature is not to be further increased or decreased.

Still another aspect is directed to One or more computer-readable media that, when invoked by computer-executable instructions, perform a method for dynamically auto-tuning a gas turbine engine. The method includes monitoring parameters of the gas turbine engine during operation, wherein the parameters quantify at least one of combustion dynamics or emission composition. Also, the method includes determining that the monitored parameters of the gas turbine engine are within predetermined upper and lower limits such that margin exists for the monitored parameters, performing at least one incremental adjustment of an inlet guide vane (IGV) angle of the gas turbine engine, and, upon performing the at least one incremental adjustment of the IGV angle, determining that at least one of the monitored parameters of the gas turbine engine is outside of predefined upper and lower limits or that a predetermined value of the IGV angle has been reached. Furthermore, the method includes determining that the margin still exists for the monitored parameters and upon determining that the margin still exists for the monitored parameters, making at least one incremental adjustment of an exhaust temperature of the gas turbine engine. Adjusting the exhaust temperature results in an adjustment of fuel flow into the gas turbine engine. Additionally, the method includes, upon at least one of the monitored parameters being outside of the predefined upper and lower limits or when the exhaust temperature has reached a value that is not to be either further increased or decreased, discontinuing the incremental adjustment of the exhaust temperature.

Yet another aspect is directed to one or more computer-readable media that, when invoked by computer-executable instructions, perform a method for dynamically auto-tuning a gas turbine engine. The method includes monitoring one or more parameters of the gas turbine engine during operation, determining that the one or more monitored parameters of the gas turbine engine are within predetermined upper and lower limits, making a first incremental adjustment of a firing temperature of the gas turbine engine. Adjusting the firing temperature results in an adjustment of fuel flow into the gas turbine engine. Further, the method includes, upon making the first incremental adjustment of the firing temperature, determining that the one or more monitored parameters of the gas turbine engine are still within the predetermined upper and lower limits, making a second incremental adjustment of the firing temperature, and, upon making the second incremental adjustment of the firing temperature, determining that the one or more monitored parameters of the gas turbine engine are still within the predetermined upper and lower limits. Additionally, the method includes determining that a predetermined value of the firing temperature has been reached such that the firing temperature is not to be further increased or decreased.

With reference to FIG. 1, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the gas turbine (GT) engine 110. The auto-tune controller 150 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit 130 may encompass a processor (not shown) coupled to the computer-readable medium. Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

As described above, embodiments of the present invention generally relate to automatically tuning a GT engine in a dynamic fashion. With reference to FIG. 1, a GT engine 110 is depicted that accommodates a plurality of combustors 115. Utilizing embodiments of the present invention, an operating condition of the GT engine 110, such as an exhaust temperature, a firing temperature, the IGV angle, etc., may be incrementally adjusted while monitoring various parameters and operating conditions, including, for example, LBO, CT, LoNX, HT, HHT, HiNX, CO, LBOtoHT, and the like. As such, FIG. 1 is provided herein as a depiction of an exemplary GT engine 110, and is described with respect to various embodiments as to how the GT engine 110 may be dynamically and automatically tuned.

Generally, for the purpose of discussion, the GT engine 110 may include any low emission combustors. In one instance, these low emission combustors may be arranged in a canannular configuration about the GT engine 110. One type of GT engine (e.g., heavy duty GT engines) may be typically provided with, but not limited to, 6 to 18 individual combustions, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby, can be applied to any number of configurations of GT engines and that the type of GT engines described herein below should not be construed as limiting on the scope of the present invention.

As discussed above, the plurality of combustors 115 (e.g., low emission combustors) may be prone to elevated levels of pressure fluctuation within the combustor liner. These pressure fluctuations are referred to as "combustion dynamics." Left alone, combustion dynamics can have a dramatic impact on the integrity and life of the plurality of combustors 115, eventually leading to catastrophic failure.

Further, when outside an optimal operating range, the GT engine 110 may emit emissions with properties that are unacceptable (i.e., exceed a predefined threshold). In embodiments, these properties of the GT engine 110 emissions may include "emission composition," which is measured periodically by a monitoring device (e.g., continuous emission monitoring system (CEMS)). By way of example, the emission composition may be measured in units of parts per million (ppm) for each of mono-nitrogen oxides (NOx) and carbon monoxide (CO), while $O_2$ may be measured in percent (%) composition. As such, "emission compositions" relate to the amount of pollutant that is generated by the GT engine 110. Once the emission composition is measured, it is compared against a critical (maximum/minimum) value to determine whether the emission composition is actually acceptable.

In embodiments, various parameters representing the combustion dynamics and/or emission compositions may be continually monitored while certain conditions are being adjusted, such as, for example, the IGV angle or the exhaust temperature of the GT engine. As such, in embodiments, it is not determined whether the parameters are unacceptable or out of range prior to adjusting an operating condition, but instead, parameters that are determined to be within predefined upper and lower limits are continuously monitored while an operating condition (e.g., exhaust temperature or IGV angle) is being incrementally adjusted.

As discussed herein, a control system for carrying out automated tuning, or the auto-tune controller 150 of FIG. 1, is used to assess the state of the GT engine 110 and the plurality of combustors 115 in terms of parameters such as the combustion dynamics, air flow, fuel-flows, emissions, and pressure distribution. These parameters of the GT engine 110 may be continually monitored while an operating condition, such as the exhaust temperature, IGV angle, or both, are adjusted incrementally. In one embodiment, an alarm is utilized to detect when any of the monitored parameters are outside of a predefined range, thus notifying the operator by way of the alarm indicator 180. Typically, the alarm is set upon detecting that any one of the monitored parameters either falls below or above a predetermined upper or lower limit and/or upon recognizing that the composition of the combustor emissions has exceeded a particular critical value while an operating condition is being incrementally adjusted. Accordingly, embodiments of the present invention concern the auto-tune controller 150, as well as the associated tuning process, that enables automatic tuning of the combustion dynamics and emissions using small incremental changes of an operating condition of the GT engine 110.

As mentioned, the auto-tune controller 150 is generally responsible for assessing the state of the GT engine 110 based on various of its parameters, emissions, operating conditions, etc., and incrementally adjusting a condition of the GT engine 110 based on a specific need, such as needing to increase or maximize the power output of the GT engine 110. The GT engine 110 comprises a processing unit 130, which includes, at least, an acquisition component 131, a processing component 132, and an adjustment component 133. The acquisition component 131 generally receives or gathers current values of parameter conditions from the emissions 121, combustion dynamics 122, GT parameters 123, gas manifold pressures 124, etc. The processing component 132 takes the values of the gathered parameters and compares these values to predetermined upper and lower values within which the value is to be. As such, the processing component 132 has access to the parameter values acquired by the acquisition component 131, and also the predefined boundaries which define the normal limits of a particular parameter. The processing component 132 is then able to make a comparison to determine whether the current parameter value being monitored is within normal, predefined limits. The adjustment component 133 receives input when an adjustment is to be made. For instance, if the IGV angle is to be adjusted, the adjustment component 133 sends a signal through the incremental bias adjustment 160, which affects a change in the GT engine 110. As such, in this case, the IGV angle is adjusted based on a command from the adjustment component 133.

In one embodiment, the adjustment to one of the operating conditions, such as exhaust temperature, firing temperature, load, fuel flow rates, IGV angle, etc., is an adjustment to a setting in the system. For example, if the current exhaust temperature of the GT engine 110 is 1200° F. and there is a 10° F. bias, the Auto-Tune Controller 150 may incrementally adjust the exhaust temperature from 1200° F. to 1210° F., each adjustment being made by the controller, and each adjustment leading to or resulting in a change in fuel flow to the GT engine 110. For exemplary purposes only, if the exhaust temperature needs to increase to meet the bias, the fuel flow may be caused to increase into the GT engine 110 to affect the change in exhaust temperature. As such, the amount of fuel flow adjustment to the GT engine 110 is determined by the value and direction (increase or decrease) of the exhaust temperature adjustment.

While operating conditions such as exhaust temperature and IGV angle are discussed in more detail herein in relation to making incremental adjustments to these conditions based on monitored parameters, other operating conditions may also be adjusted. For example, firing temperature may be incrementally adjusted, which may lead to or result in an adjustment to the fuel flow into the GT engine. Also, fuel flow rates, load, and relative load may be used instead of or in addition to exhaust temperature and IGV angle.

Once the operating condition (e.g., exhaust temperature, firing temperature, load, relative load, load percentage, fuel flow rates, or IGV angle) adjustment is made, the process reiterates. That is, the steps of (a) monitoring one or more parameters, (b) comparing the values of the one or more monitored parameters to predefined upper and lower limits for the respective monitored parameter, and (c) determining which operating condition (e.g., exhaust temperature or IGV angle) to adjust and by how much are repeated if there is a need to increase power or the like.

In addition, the auto-tune controller 150 is provided with the data store 135. Generally, the data store 135 is configured to store information associated with the tuning process or data generated upon monitoring the GT engine 100. In various embodiments, such information may include, without limitation, measurement data (e.g., emissions 121, combustions dynamics 122, GT parameters 123, and gas manifold pressures 124) provided by sensors 120 coupled to the GT engine 110. In addition, the data store 135 may be configured to be searchable for suitable access of stored information. For example, the data store 135 may store predetermined upper and lower limits for a plurality of parameters that may be monitored while adjusting the exhaust temperature, IGV angle, etc.

Further, the data store 135 may store values that correspond to the adjusted operating condition. For instance, if the IGV angle is adjusted until one of the monitored parameters is out of the normal range, the value of the IGV angle before that parameter was out of range may be saved in the data store 135 for future reference. This is particularly useful when, in the future, ambient conditions are similar. These values can be accessed and retrieved from the data store 135 and used in future tunings when, for example, it is desired to optimize power or increase power of the GT engine 110. It will be understood and appreciated that the information stored in the data store 135 may be configurable and may include any information relevant to the tuning process. The content and volume of such information are not intended to limit the scope of embodiments of the present invention.

An exemplary technical problem that was overcome by way of embodiments of the present invention was to utilize existing Emissions Margin to enhance power output, or to reduce firing temperature to enhance emissions and durability margin. Existing solutions are passive, or without closed loop feedback (e.g., increasing firing temperature without checking for emissions or combustion dynamics/pulsation margins), thus resulting in emissions non-compliance and shorter durability.

Embodiments of the present invention include upgrading the capability of an AutoTune system to incrementally adjust a gas turbine control firing curve to optimize for power, emissions, and durability by incrementally biasing the exhaust and/or firing temperature and/or IGV angles during baseload operation. Power+ is a selectable upgrade in current Auto-Tune systems to enable automatic incremental IGV and exhaust temperature control curve biasing up to a user-defined limit to maximize power output while maintaining emissions and dynamics within limits. The logic can be reversed to enable automatic incremental IGV and exhaust temperature control curve biasing down to a user-defined limit to optimize/reduce emissions and combustion dynamics/durability. One advantage is the incremental and constant closed loop feedback nature of biasing the exhaust/control firing curve using the AutoTune system.

It should be noted that AutoTune, in part, is responsible for biasing curves that are provided and executed by the controller to the engine. AutoTune biases these curves to tell the controller to run at a different exhaust temperature, split, etc., based on its monitoring of many system parameters. In other words, AutoTune provides a bias to the engine operating curves and the OEM control operates the engine as it desires based on the biased operating curves. The curves are stored by the controller, and the controller actually adjusts fuel flow to the engine, but the curves are biased by AutoTune. AutoTune, by itself, may not alter fuel flow, IGV angle, etc. Further, while the term "AutoTune" is used herein, it should be noted that this simply refers to a system for automatically and dynamically tuning a combustor, and is not intended to limit embodiments of the present invention in any way.

Figure 2:
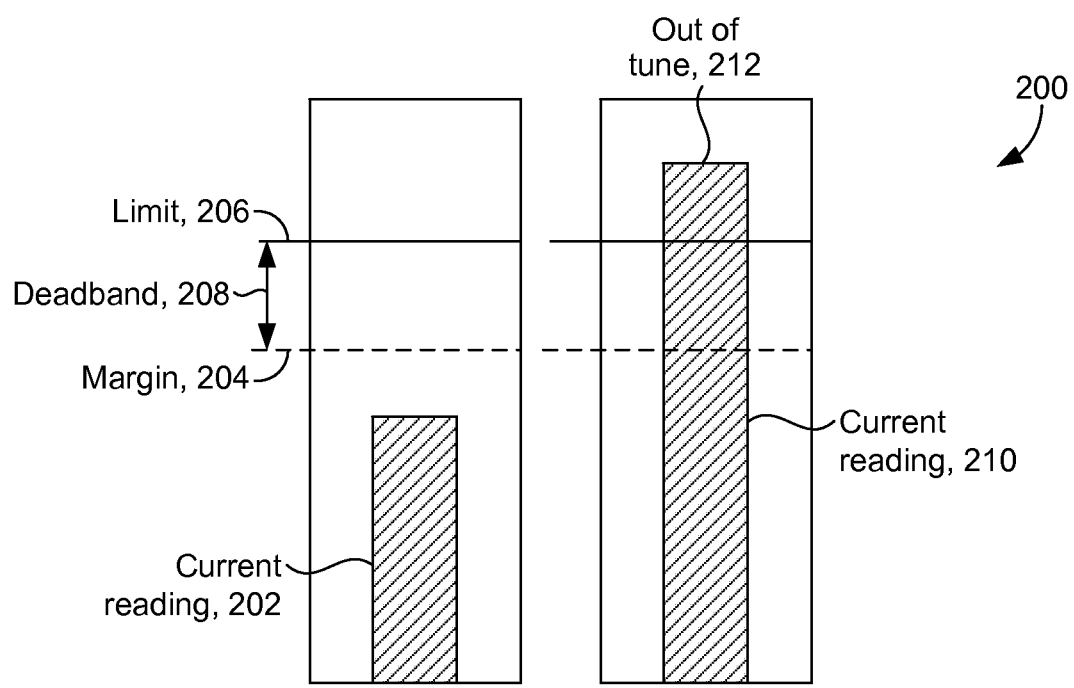
FIG. 2 is an exemplary graph illustrating a particular monitored parameter being within the margin, and being outside of the margin, in accordance with an embodiment of the present invention.

As mentioned herein, in embodiments, incremental optimization is utilized to provide power output results of the GT engine. The values to which a particular operating condition being modified is set are not randomly chosen, but rather selected after consulting a firing curve in an incremental fashion. FIG. 2 illustrates an exemplary graph 200 of a particular monitored parameter being within the margin, and being outside of the margin, in accordance with an embodiment of the present invention. A current reading 202 is illustrated as being below the margin 204. The deadband 208 is between the margin 204 and the limit 206. This particular parameter is under the margin 204, and thus it would be said that there is margin available for this particular parameter being monitored. The deadband 208 represents certain values of the parameter where no action would be taken. Typically, a parameter is not out of tune until it exceeds the limit 206. As shown in current reading 210, this particular parameter exceeds the limit 206, and thus is out of tune 212. The exhaust temperature is adjusted by applying a bias on the exhaust temperature relative to the firing curve value. The IGV angle is adjusted by applying a bias on the IGV relative to a reference value.

Figure 3:
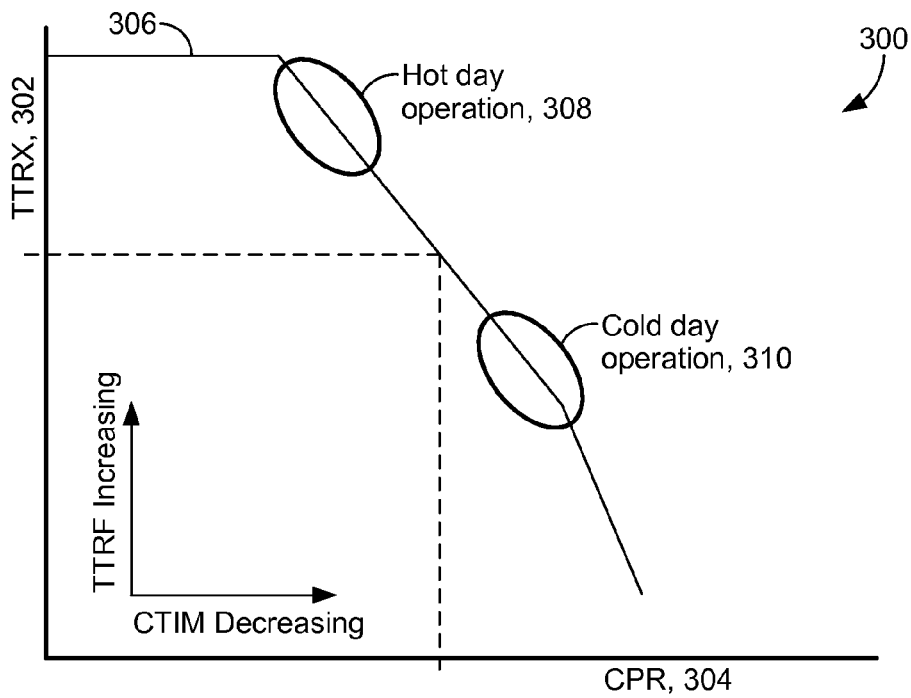
FIG. 3 depicts an exemplary plot on a graph illustrating compression ratio in relation to exhaust temperature, in accordance with an embodiment of the present invention.

FIG. 3 illustrates a graph 300 of an exemplary firing curve 306, in accordance with an embodiment of the present invention. This is a firing curve 306 of a typical GT engine, which is controlled through the exhaust temperature (on y-axis 302), and which correlates to the firing temperature of the GT engine, or the output. The x-axis on this curve is the compressor pressure ratio 304, also referred to herein as CPR. Compressor pressure ratio is a function of inlet temperature, or CTIM. The requested exhaust gas temperature (TTRX) is scheduled as a function of the compressor pressure ratio. Additionally, firing temperature and fuel flow are directly related to the exhaust temperature of the GT engine.

On a cold day, illustrated by cold day operation 310, flow into the GT engine is increased and the system compresses the air at a hotter temperature, which produces a higher CPR. On a hot day, however, less air flow is allowed into the GT engine, and the GT engine generally operates at a higher temperature, illustrated by hot day operation 308.

When the engine is at baseload at a point on the curve, that location may be incrementally biased if there is available margin of emissions or dynamics. Incrementally adjusting the IGV angle, which affects the CPR, refers to opening up the IGV valve slightly if there is margin. As described herein, the system may continue opening it up incrementally. As the IGV angle is further opened or increased, more air flow enters, resulting in more power. Typically, NOx emissions are reduced when more air flow is allowed to enter the GT engine, thus producing a lower exhaust temperature. The IGV angle may be opened only to a certain amount—usually only 4 or 5 degrees above the reference point. For example, for an IGV angle opened to 84 degrees, in one embodiment, the system may be able to potentially open it up to 90 degree at the maximum. Adjusting the IGV angle adjusts how much flow is allowed into the GT engine. Utilizing embodiments provided herein, each time the IGV angle is increased, feedback is monitored. As such, the GT controller adjusts fuel flow to ensure that the measured exhaust gas temperature is nearly equal to the TTRX.

Figure 4:
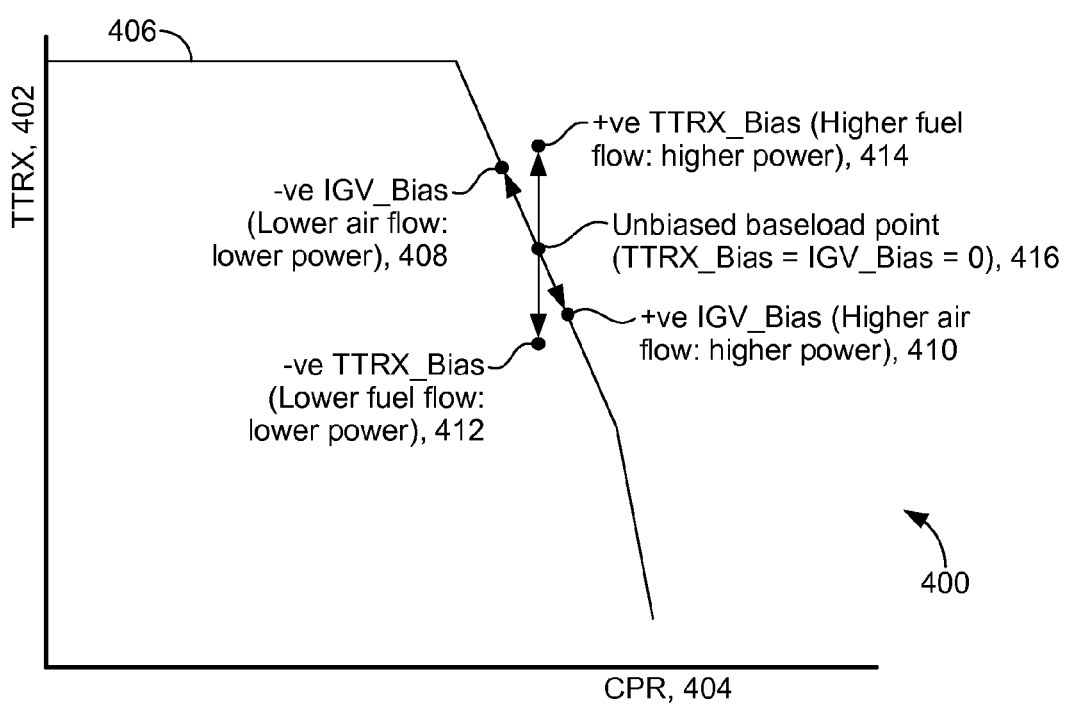
FIG. 4 depicts an exemplary plot on a graph illustrating compression ratio in relation to exhaust temperature, in accordance with an embodiment of the present invention.

FIG. 4 depicts an exemplary plot 406 on a graph 400 illustrating compression pressure ratio in relation to exhaust temperature, in accordance with an embodiment of the present invention. FIG. 4 illustrates the effect of the IGV angle and exhaust temperature variation on power output. The graph 400 of FIG. 4 illustrates exhaust temperature 402 as a function of compressor pressure ratio 404. As shown at box 408, the lower the air flow, based on a change of the IGV angle, the lower the power output. At box 410, the higher the air flow, based on a change of the IGV angle, the higher the power output. At box 412, the lower the fuel flow, based on a change in the exhaust temperature, the lower the power output. At box 414, the higher the fuel flow, based on a change in the exhaust temperature, the higher the power output. Point 416 is the unbiased baseload point, for which the biases of the IGV angle and the exhaust temperature are both set to 0. In embodiments, the step size of the applied bias, the minimum bias, and the maximum bias are all user defined, and may be predetermined prior to the time of tuning. For example, setting a minimum TTRX_Bias=minimum IGV_Bias=0 would ensure that the auto-tuning system never decreases baseload power.

In an embodiment, one approach to adjusting the IGV bias and the exhaust temperature bias is as follows. If some tuning margin exists, the IGV bias may be raised until one of the monitored parameters is within its deadband or until the IGV bias reaches the maximum allowed. Then, if some tuning margin still exists, the exhaust temperature bias may be raised until one of the monitored parameters is within its deadband or until the exhaust temperature bias reaches the maximum allowed. If an out of tune is detected for any of the monitored parameters, the system attempts to clear the out of tune by adjusting a split bias. If there is no tune margin or the system has failed a certain number of times in a row to clear the out of tune, then the system starts adjusting the exhaust temperature bias and/or the IGV bias. Embodiments of the present invention take advantage of a margin to maximize power while avoiding out of tunes of the monitored parameters.

Figure 5:
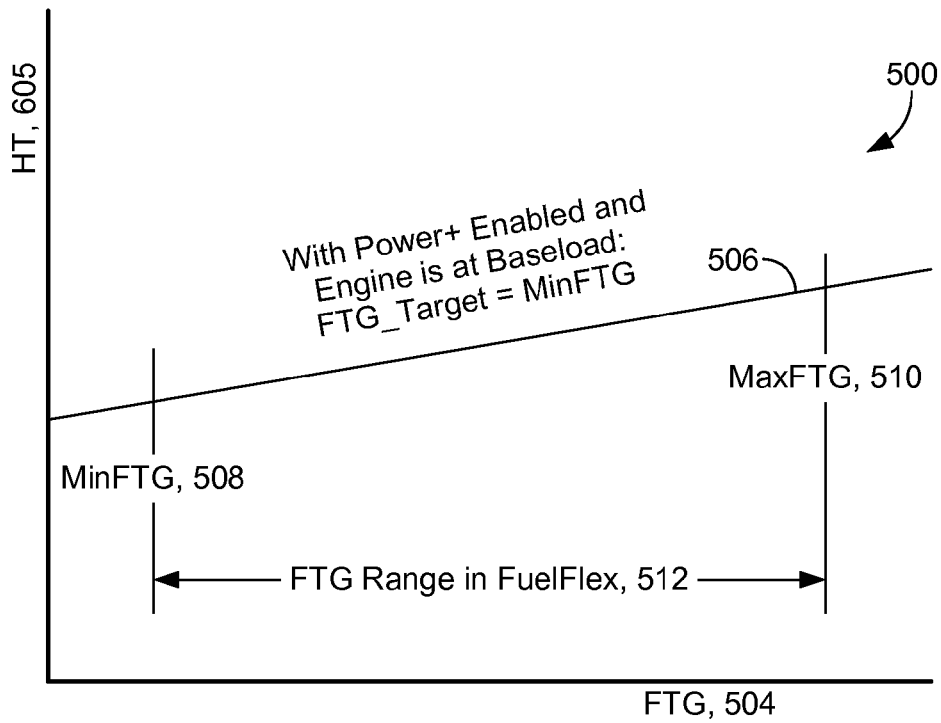
FIG. 5 depicts an exemplary plot on a graph illustrating hot tone in relation to fuel gas temperature, in accordance with an embodiment of the present invention.

FIG. 5 depicts an exemplary plot 506 on a graph 500 illustrating hot tone in relation to fuel gas temperature, in accordance with an embodiment of the present invention. As mentioned, one goal of the embodiments described herein is to maximize power output of the GT engine. In one embodiment, while the system is enabled and the GT engine is at baseload, the system may set a FTG_Target to MinFTG to maximize HT margin, thus allowing maximum power boost. The graph 500 illustrates hot tone 502 on the y axis and fuel gas temperature (FTG) 504 on the x axis. The graph illustrates the minimum FTG 508, the maximum FTG 510, and the FTG range.

In one embodiment, before the exhaust temperature or the IGV angle is adjusted or biased, the GT engine is at baseload for a user-defined period of time. Also, the conditions may be such that there are stable emissions, stable exhaust temperature, heat soaked, etc.

Figure 6:
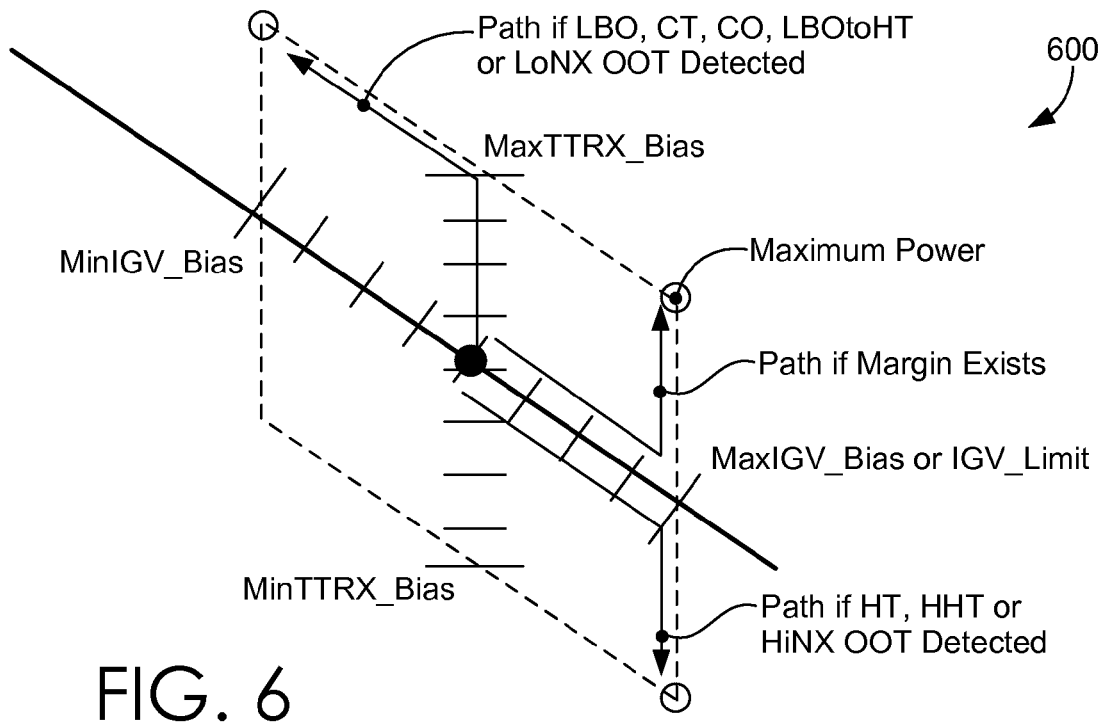
FIG. 6 illustrates an exemplary graph of IGV angle and exhaust temperature bias based on monitored parameters and power output, in accordance with an embodiment of the present invention.

FIG. 6 illustrates an exemplary graph 600 of IGV angle and exhaust temperature bias based on monitored parameters and power output, in accordance with an embodiment of the present invention. FIG. 6 illustrates a summary of the tuning system's response to an existing margin or to a monitored parameter being out of tune (OOT). In particular, FIG. 6 illustrates a path if margin exists for particular monitored parameters, and a different path if margin does not exist, such as if it is detected that a monitored parameter, such as HT, HHT, or HiNX, is out of tune. A different path is illustrated if it is detected that a monitored parameter, such as LBO, CT, CO, LBOtoHT, or LoNX is out of tune. As such, the response (e.g., the bias of the IGV angle) depends upon the type of OOT detected (e.g., which monitored parameter is determined to be out of tune) or if margin exists for that particular parameter.

Figures 7, 8:
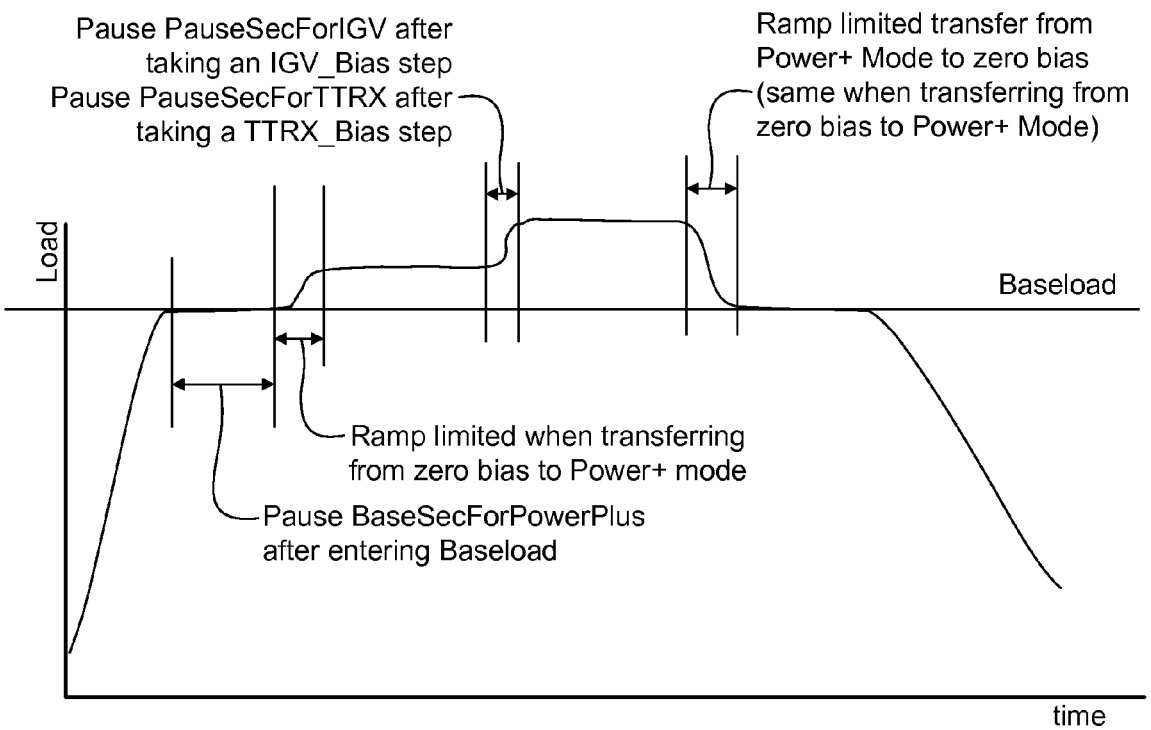
FIG. 7 illustrates a tuning sequence table listing parameters in order of response, in accordance with an embodiment of the present invention.
FIG. 8 illustrates a plot on an exemplary graph depicting load in relation to time, in accordance with an embodiment of the present invention.

Turning now to FIG. 7, an exemplary tuning sequence table 700 is shown that lists parameters in order of response, in accordance with an embodiment of the present invention. The order of parameters illustrated in FIG. 7 is exemplary, and is for illustrative purposes only. In other embodiments, the order of parameters may be different. Tuning sequence table 700 is provided for exemplary purposes only. As mentioned, the response of the auto-tuning system depends on the parameter being detected as being out of tune. In the event of multiple and simultaneous parameters being out of tune, the auto-tuning system utilizes a tuning sequence table, such as table 700, to determine which parameter will be responded to first. As such, as shown here, lean blowout is the first parameter responded to, followed by cold tone, low NOx, hot tone, high hot tone, high NOx, carbon monoxide, and a ratio of lean blowout to hot tone.

FIG. 8 illustrates a plot on an exemplary graph 800 depicting load in relation to time, in accordance with an embodiment of the present invention. Graph 800 illustrates the pauses taken after entering baseload, and after each bias step, such as after the IGV angle or exhaust temperature is adjusted incrementally. One reason for the pauses is to allow the system to react to the adjusted IGV angle or exhaust temperature. Also, values of the monitored parameters are gathered during this time to determine what the next adjustment will be, or even if there will be a next adjustment (e.g., if a parameter is out of tune).

Figure 9:
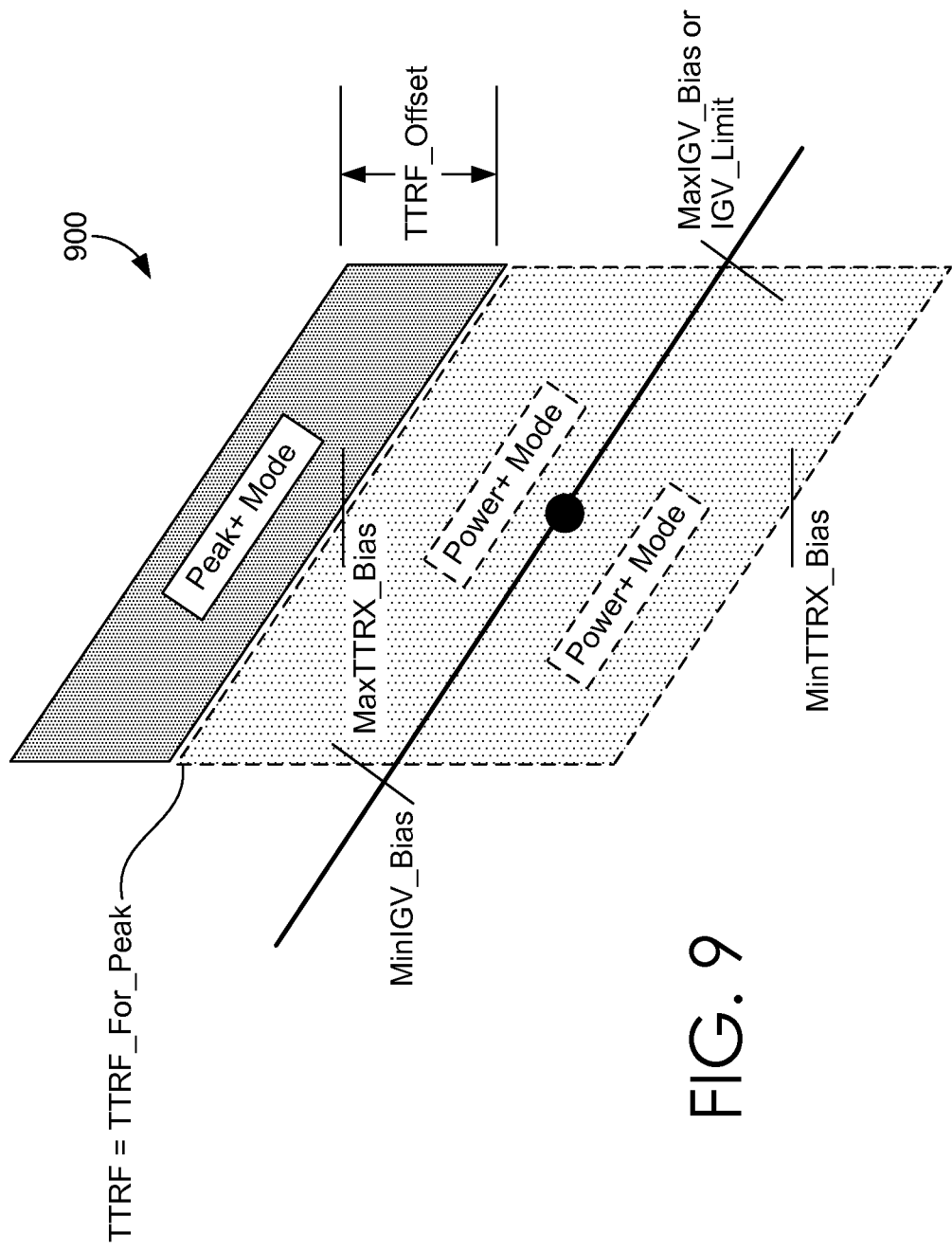
FIG. 9 illustrates an exemplary graph of IGV angle and exhaust temperature bias based on maximum and minimum limits, in accordance with an embodiment of the present invention.

FIG. 9 illustrates an exemplary graph 900 of IGV angle and exhaust temperature bias based on maximum and minimum limits, in accordance with an embodiment of the present invention. There may be multiple modes under which the auto-tuning system may operate. For instance, as shown in FIG. 9, a normal mode (e.g., Power+ Mode) and a peak mode (e.g., Peak+ Mode) may each indicate that different biases are to be implemented for firing temperature (TTRF), exhaust temperature, and the IGV angle. TTRF offset is added to the maximum TTRX_Bias allowed by the system. If TTRF exceeds the TTRF_for_Peak, the unit may be in the peak mode. The unit can then be fired up to a TTRF value up to the value of TTRF_for_Peak+TTRF_Offset.

Figure 10:
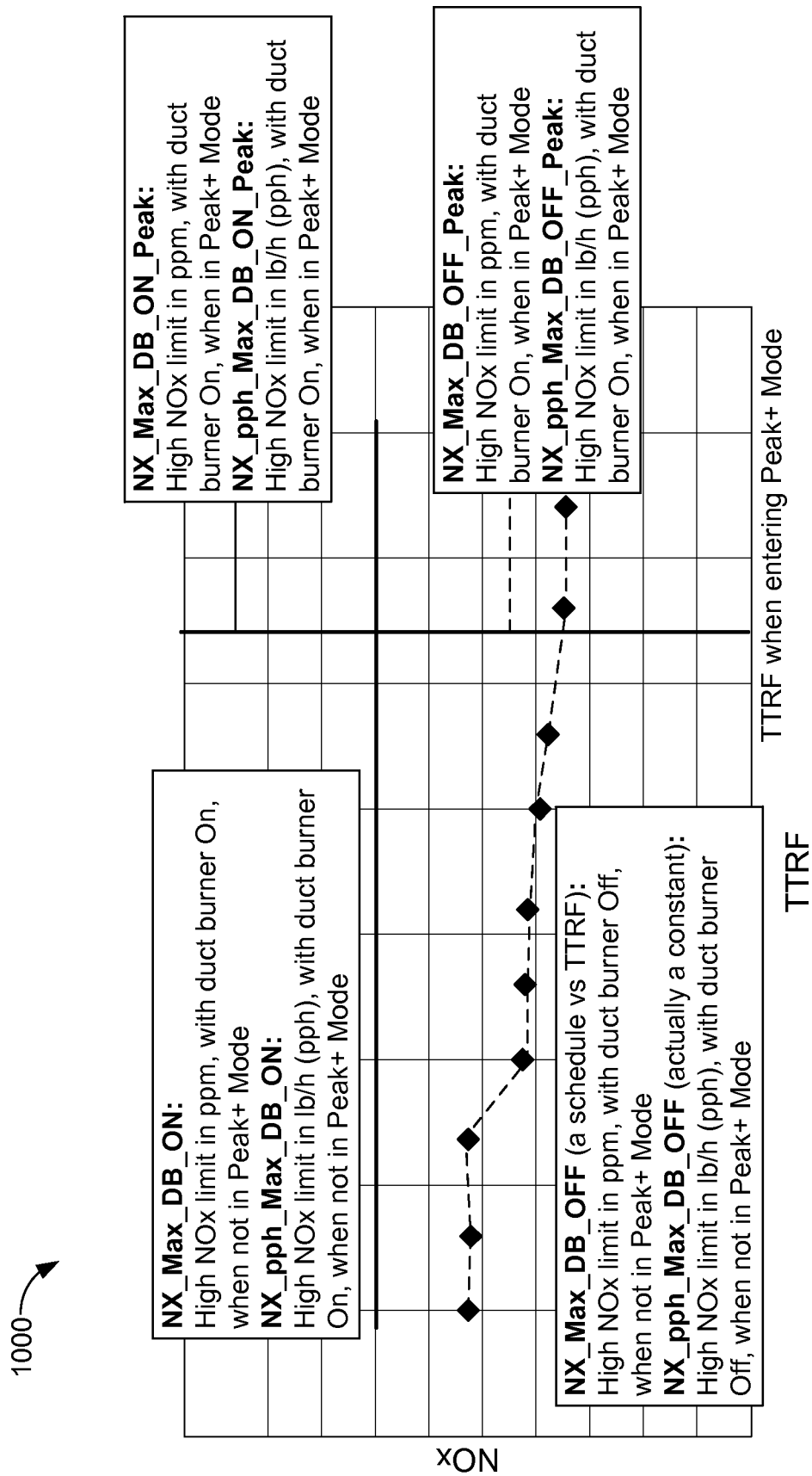
FIG. 10 illustrates a NOx tuning limit plot on an exemplary graph of NOx levels in relation to exhaust temperature, in accordance with an embodiment of the present invention.

Referring now to FIG. 10, a NOx tuning limit plot is illustrated on an exemplary graph 1000 of NOx levels in relation to exhaust temperature, in accordance with an embodiment of the present invention. This plot illustrates NOx rates as a function of the firing temperature of the GT engine.

Figure 11:
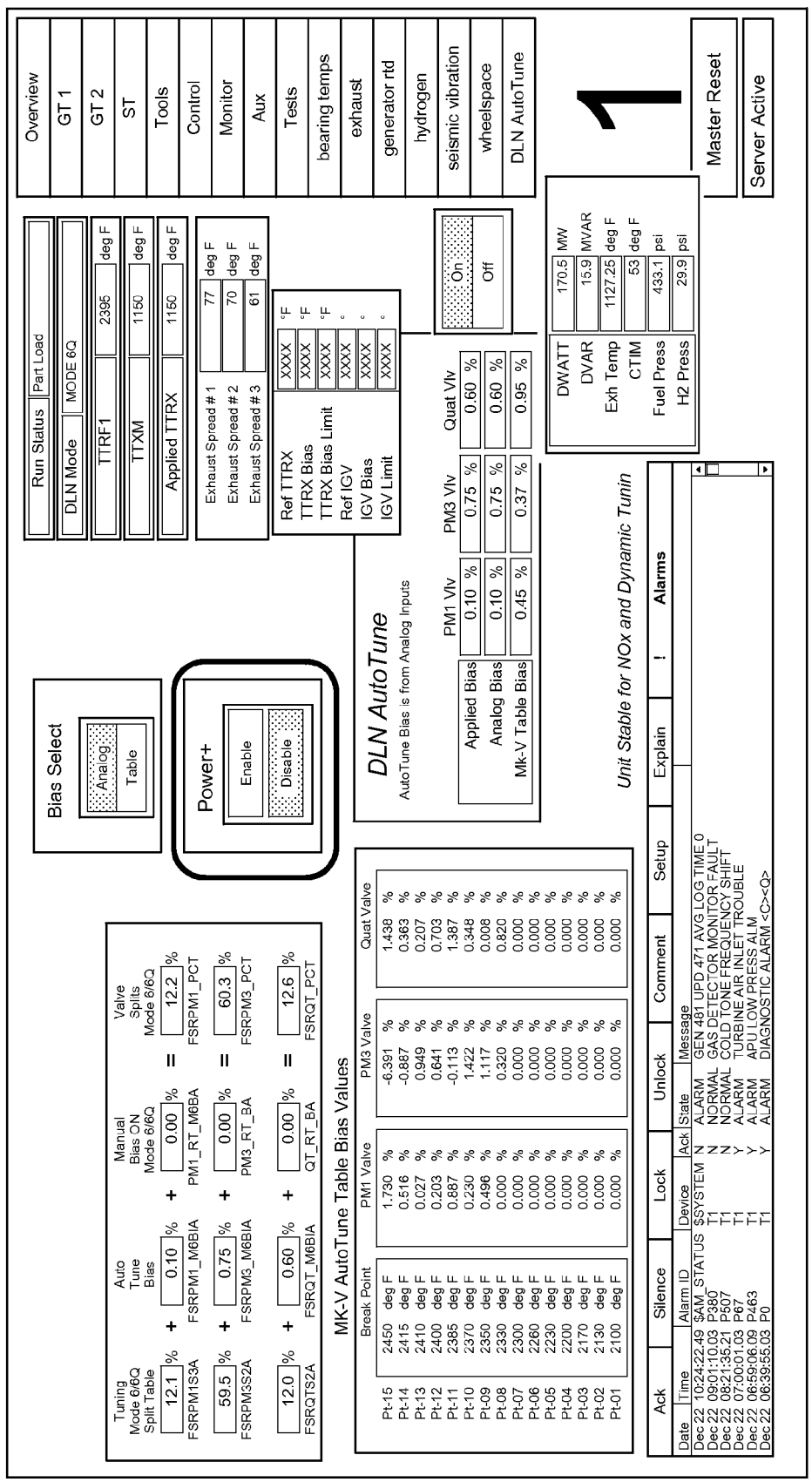
Figure 12:
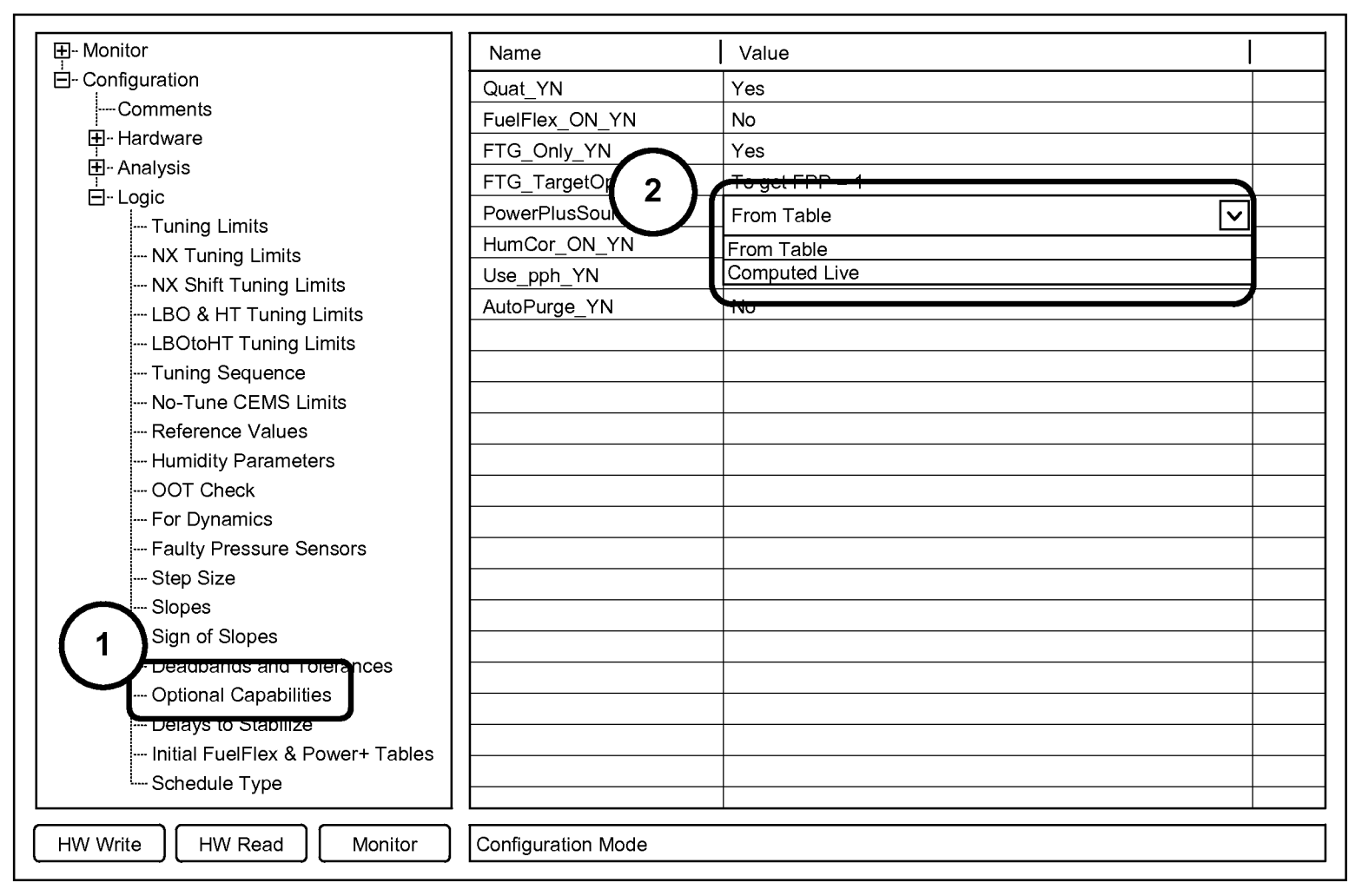
Figure 13:
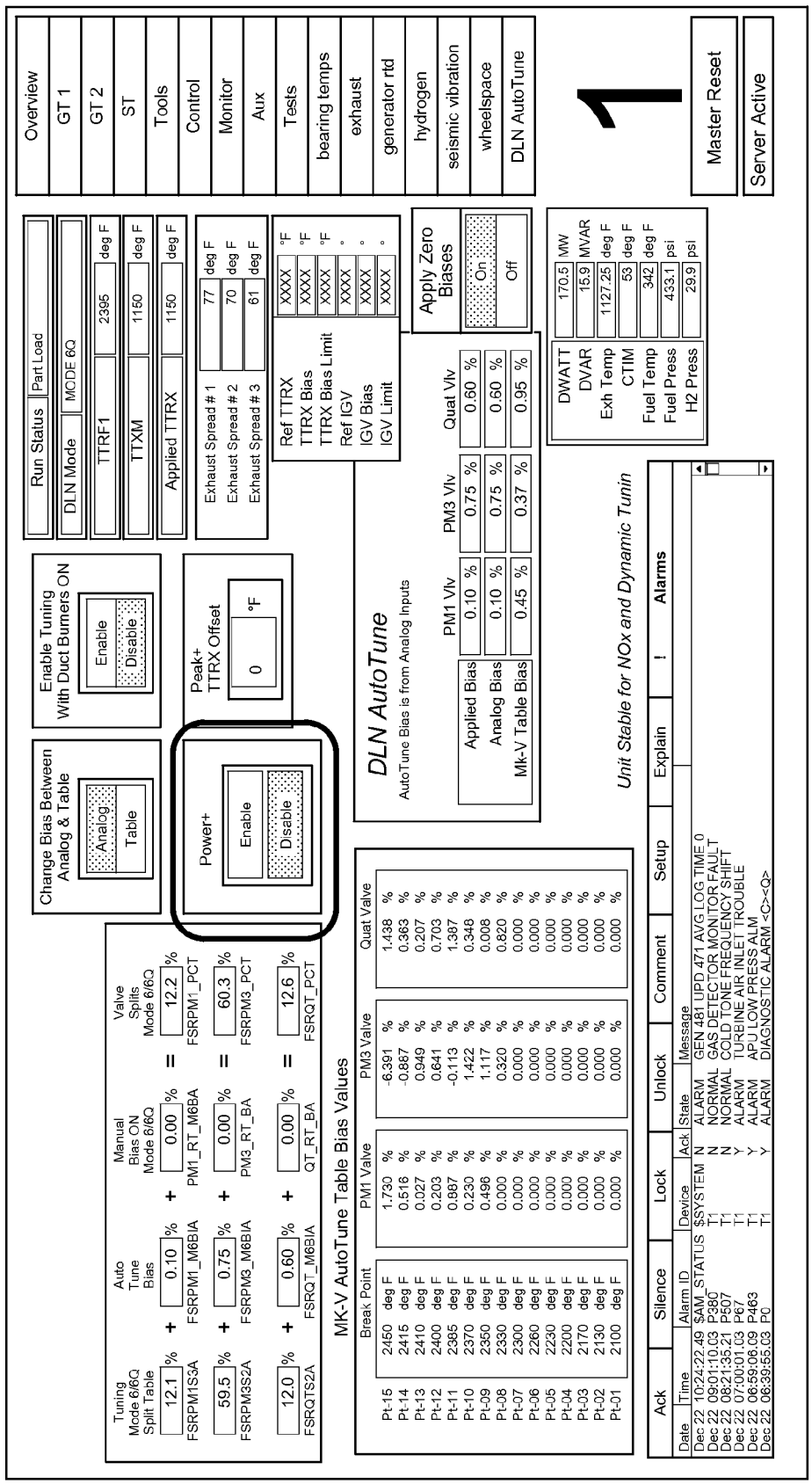
Figure 14:
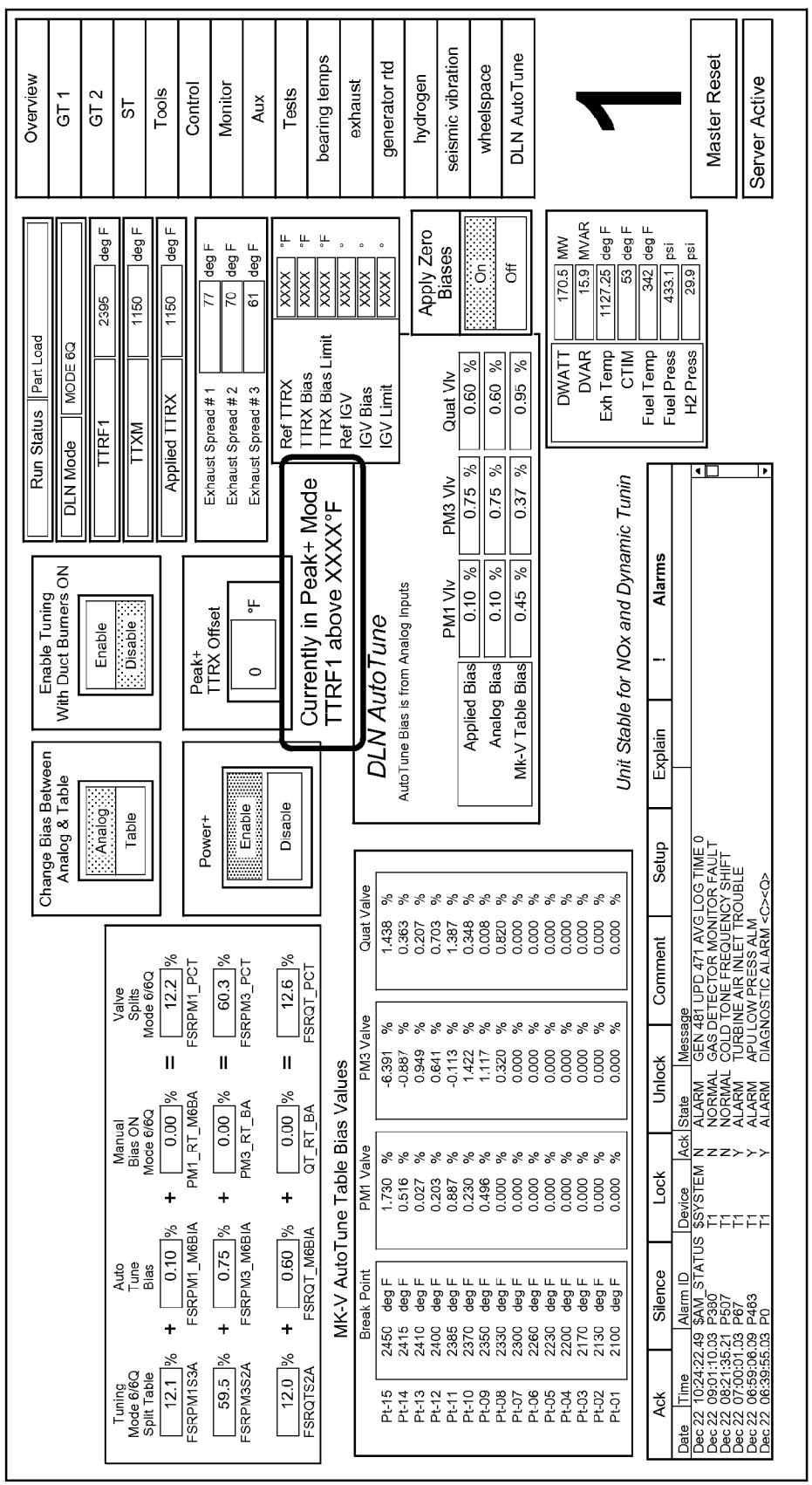
Figure 15:
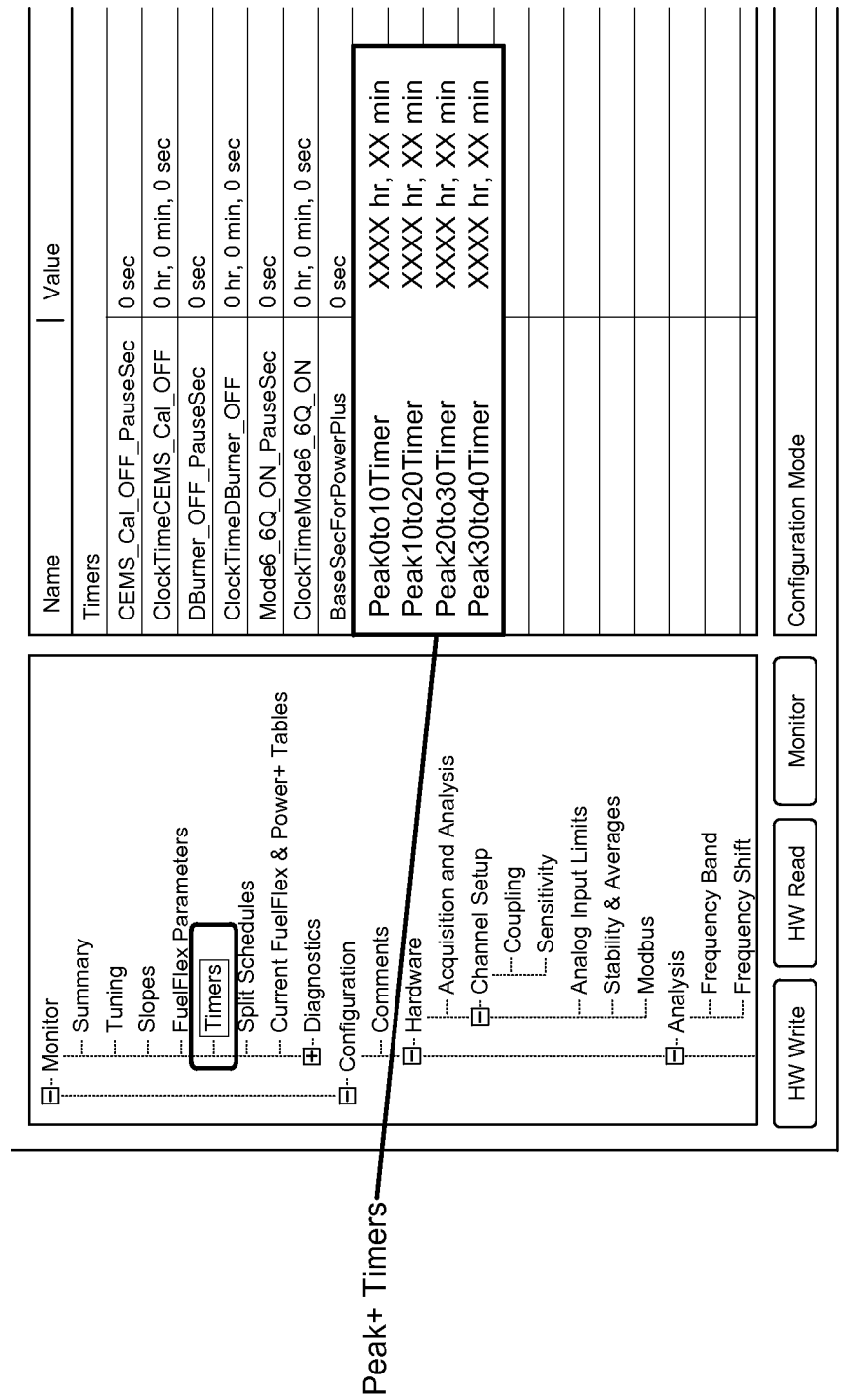
Figure 16:
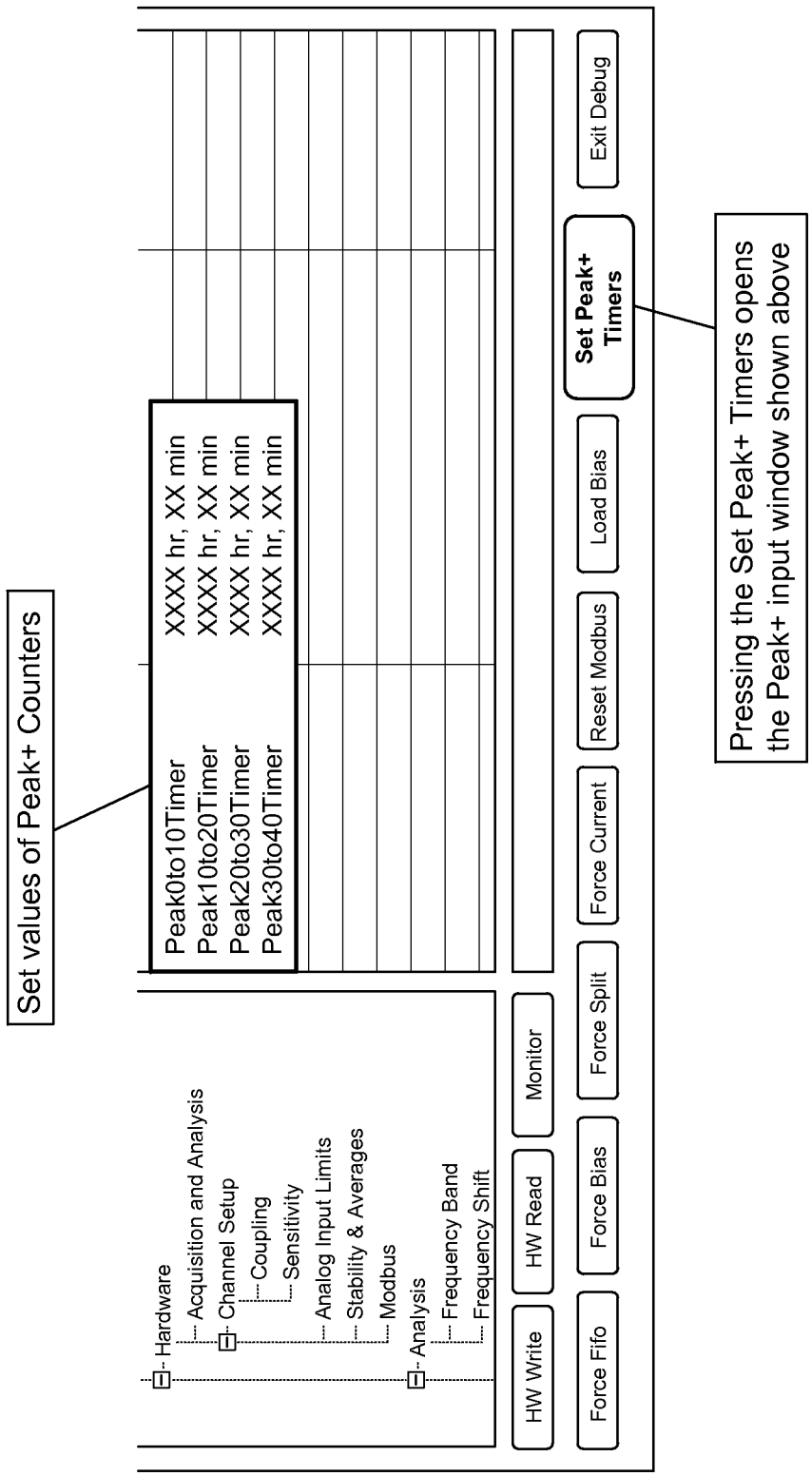

FIGS. 11-16 illustrate exemplary screen shots of an auto-tune system for adjusting an operation condition of a GT engine based on one or more monitored parameters, in accordance with an embodiment of the present invention. FIG. 11 illustrates an exemplary auto-tuning system user interface or screen shot. As shown, to enable the system to turn on or off, enable and disable buttons are provided. FIG. 11 also illustrates various portions of the user interface, including a table of bias values, temperatures, load, and monitored parameters. FIGS. 12-16 are not described individually in detail, but each provides a different screen shot while biases to the exhaust temperature or IGV angle are being made to the system while parameters are monitored.

Figure 17:
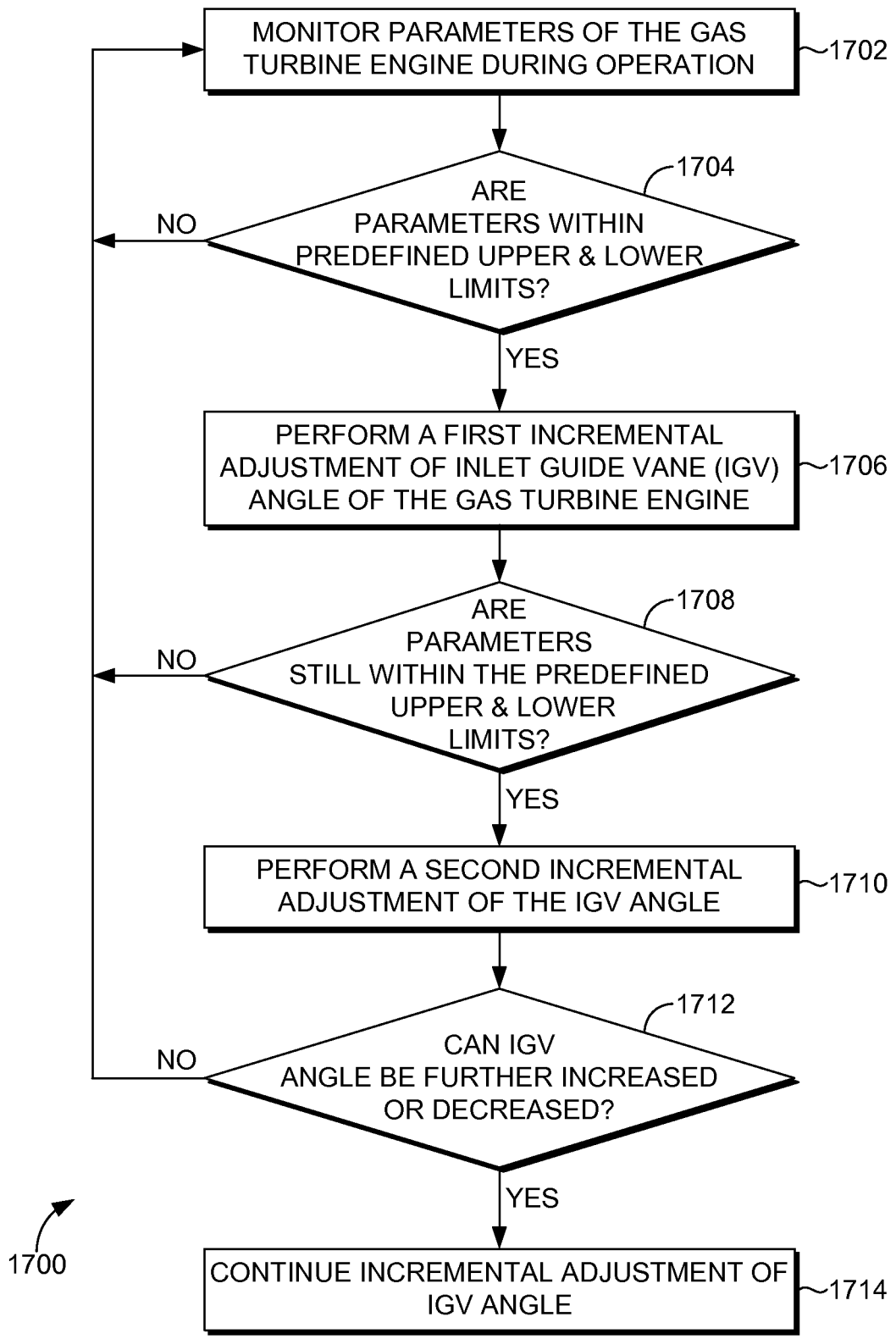
FIG. 17 illustrates a flow diagram of a method for dynamically auto-tuning a gas turbine engine, in accordance with an embodiment of the present invention.

FIG. 17 illustrates a flow diagram of a method 1700 for dynamically auto-tuning a GT engine, in accordance with an embodiment of the present invention. Initially, at step 1702, parameters of the GT engine are monitored during its operation. In embodiments, these monitored parameters are associated with combustion dynamics and/or emission composition. For instance, exemplary parameters that are monitored may include lean blowout, cold tone, low NOx, hot tone, high hot tone, high NOx, carbon monoxide, a ratio of lean blowout to hot tone, and the like. At step 1704, it is determined whether the monitored parameters are within predefined upper and lower limits. If they are not, the parameters may continue to be monitored, and in one embodiment, the bias of the IGV angle may not occur. If they are within the limits, a first incremental adjustment of the IGV angle of the GT engine is performed at step 1706. Increasing the IGV angle increases power output of the GT engine, whereas decreasing the IGV angle decreases power output of the GT engine. Furthermore, when the IGV angle is increased, a flow of air is increased, thus decreasing the fuel-to-air ratio in the GT engine. Likewise, decreasing the IGV angle decreases the flow of air in the GT engine.

At step 1708, it is determined whether the parameters are still within the predefined upper and lower limits. If they are not, the parameters may continue to be monitored, and the IGV angle may not be further adjusted. If they are within the limits, a second incremental adjustment of the IGV angle is performed, shown at step 1710. At step 1712, it is determined whether the IGV angle can be further increased or decreased. This may correspond to the IGV angle being at its maximum or minimum value, or whether any of the monitored parameters are outside the predefined limits. If the IGV angle can be further adjusted, the incremental adjustment of the IGV angle is continued at step 1714.

In some embodiments, many more incremental adjustments are performed. The number of incremental adjustments is determined on how much margin the monitored parameters have, and how far away the current angle of the IGV is from its maximum or minimum. If the IGV angle cannot be further increased or decreased, the parameters may continue to be monitored. In one embodiment, it is determined that the predetermined value of the IGV angle has been reached. In this instance, the current value of the IGV angle is stored in a database for future reference. For instance, under similar ambient conditions, the optimal IGV angle where the monitored conditions are within normal limits may be used at some time in the future.

For instance, in an embodiment, a third incremental adjustment of the IGV angle of the GT engine is performed. Upon making this adjustment, it may be determined that the monitored parameters are still within the predetermined upper and lower limits. If desired, a subsequent incremental adjustment of the IGV angle may be made.

Figure 18:
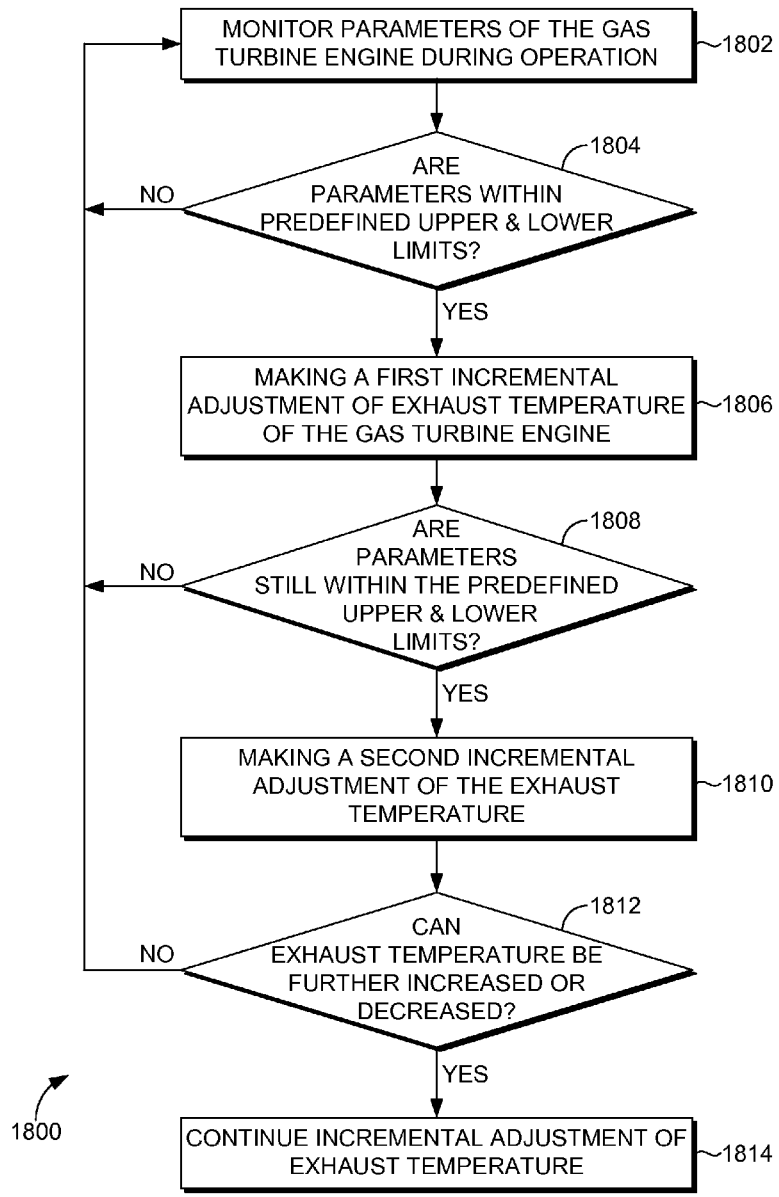
FIG. 18 illustrates a flow diagram of a method for dynamically auto-tuning a gas turbine engine, in accordance with an embodiment of the present invention.

FIG. 18 illustrates a flow diagram of a method 1800 for dynamically auto-tuning a GT engine, in accordance with an embodiment of the present invention. Initially at step 1802, parameters of the GT engine are monitored during operation.

The parameters, in one embodiment, quantify combustion dynamics and/or emission composition. At step 1804, it is determined whether the parameters are within predefined upper and lower limits. If any of the monitored parameters are not within predefined limits, they may continue to be monitored, and some other course of action may take place to ensure all parameters are within normal limits. If they are within the normal limits, a first incremental adjustment of the exhaust temperature of the GT engine is made at step 1806. As used herein, making an incremental adjustment of the exhaust temperature refers to a controller, such as the Auto-Tune Controller 150 of FIG. 1, adjusting the exhaust temperature in the control system. In order to actually change the exhaust temperature, fuel flow to the GT engine may be increased, decreased, or a fuel flow split may be adjusted. As such, making an adjustment to the exhaust temperature may result in or lead to an adjustment of the fuel flow into the GT engine. This adjustment to the fuel flow is made by the Auto-Tune Controller (e.g., item 150 of FIG. 1).

At step 1808, it is again determined whether the parameters are still within the predefined upper and lower limits. If not, the parameters may continue to be monitored, but a subsequent adjustment to the exhaust temperate may not occur. In fact, the previous adjustment of the exhaust temperature may be reversed to allow the parameters to again be within normal limits. If the parameters are still within the predefined upper and lower limits, a second incremental adjustment of the exhaust temperature is made, shown at step 1810. Again, the second incremental adjustment to the exhaust temperature refers to an increase or decrease of the exhaust temperature setting by a controller. If the setting of the exhaust temperature is to be increased, for instance, the controller may adjust fuel flow into the GT engine in order to affect the change in exhaust temperature. It is then determined at step 1812 whether the exhaust temperature can be further increased or decreased, such as in the direction of the previous incremental adjustments. If not, the parameters may continue to be monitored, but further adjustments are not performed. In embodiments, the monitoring of the parameters may discontinue at some point in time. If the exhaust temperature can further be adjusted, incremental adjustments of the exhaust temperature are continued at step 1814.

In embodiments, a value associated with the second incremental adjustment of the exhaust temperature or the last incremental adjustment made is stored in a database such that the value can be later retrieved or accessed and used when similar ambient conditions are present.

Figure 19:
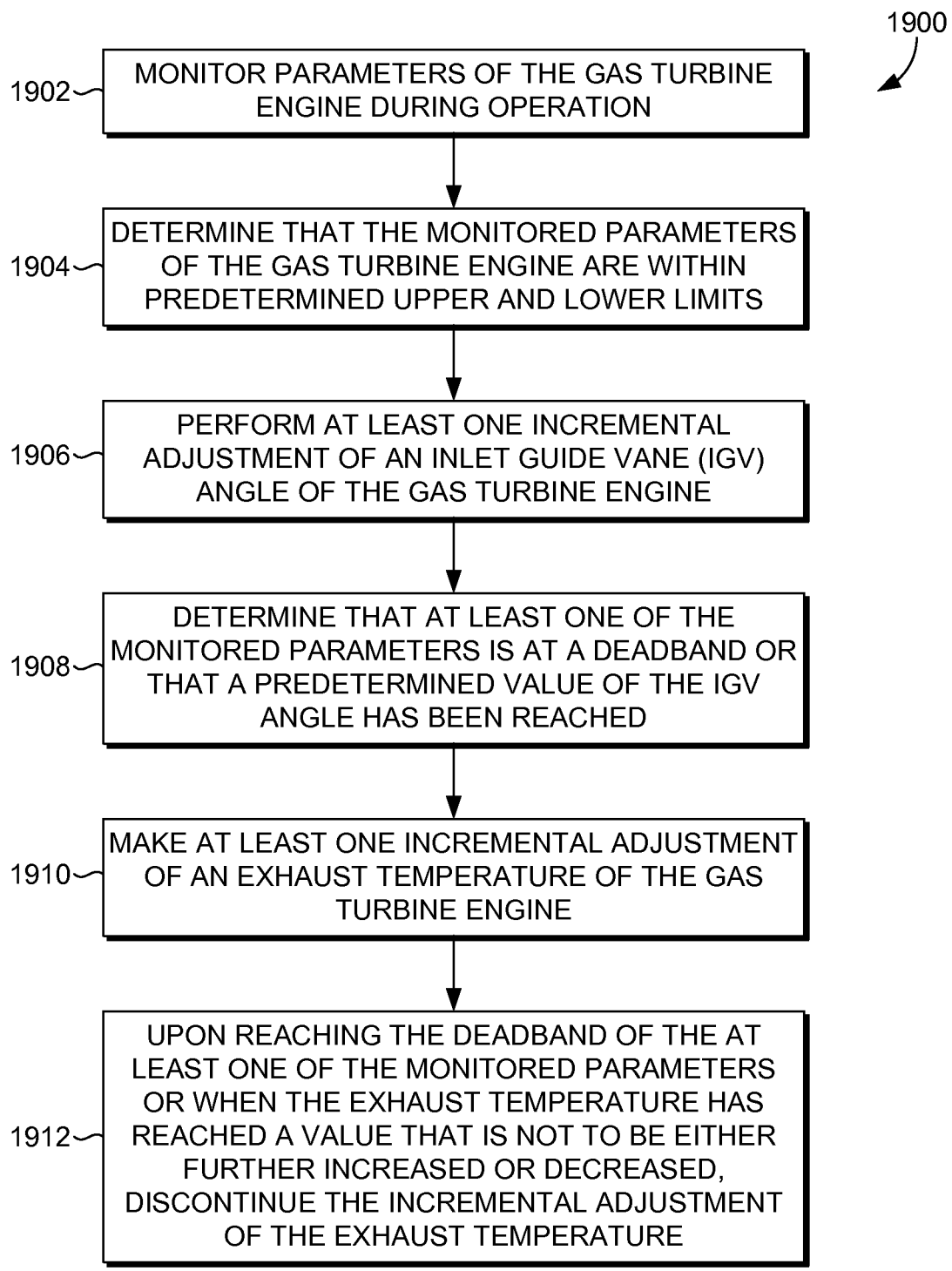
FIG. 19 illustrates a flow diagram of a method for dynamically auto-tuning a gas turbine engine, in accordance with an embodiment of the present invention.

Referring to FIG. 19, a flow diagram is illustrated of a method 1900 for dynamically auto-tuning a GT engine, in accordance with an embodiment of the present invention. At step 1902, parameters of the GT engine during operation are monitored. At step 1904, it is determined that the monitored parameters of the GT engine are within predetermined upper and lower limits. At step 1906, at least one incremental adjustment of an IGV angle of the GT engine is performed. It is determined, at step 1908, that at least one of the monitored parameters is outside of predetermined upper and lower limits or that a predetermined value of the IGV angle has been reached. At step 1910, at least one incremental adjustment of an exhaust temperature of the GT engine is then made which results in, for example, an adjustment of the fuel flow into the GT engine. Upon a monitored parameter being outside of the predetermined upper and lower limits or when the exhaust temperature has reached a value that is not to be further increased or decreased, the incremental adjustment of the exhaust temperature is discontinued, shown at step 1912. In one embodiment, determined that a margin still exists for the monitored parameters further comprises determining that a difference between a current value of any of the monitored parameters and a value of an upper limit or a lower limit for a respective monitored parameter is greater than a predetermined threshold value. In an alternative embodiment, determining that margin still exists comprises determining that the value of a particular monitored parameter is within the predefined upper and lower limits.

An exemplary purpose of the embodiments described herein is to make a small change, and look to see what happens after each small change. In embodiments provided herein, the system is detecting if there is an available margin for a particular monitored parameter, and then incrementally adjusting a firing curve to use up all or a portion of that available margin. By manipulating the firing curve, power output of the GT engine can be increased, while system parameters are brought into compliance.

Figure 20:
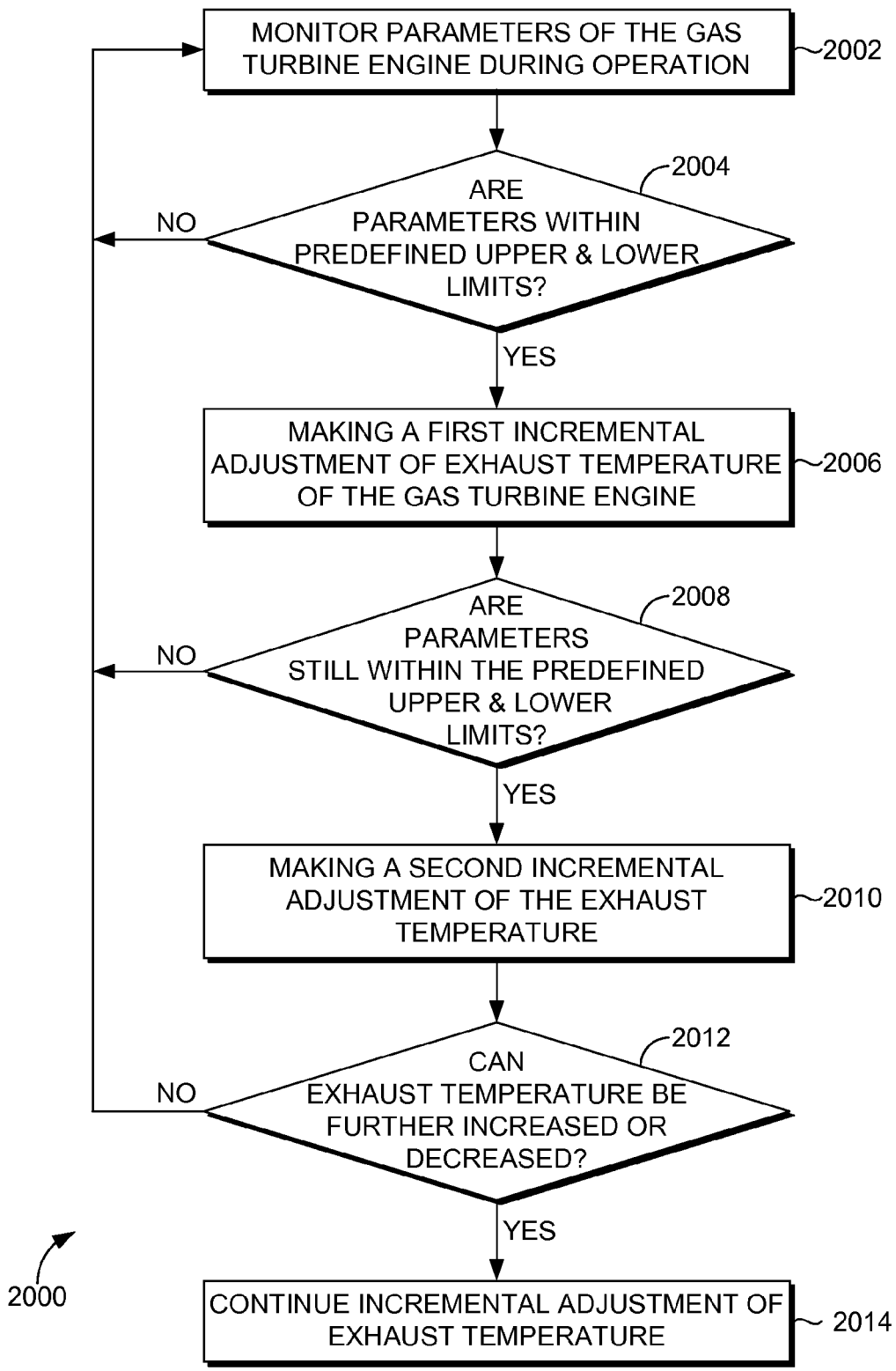
FIG. 20 illustrates a flow diagram of a method for dynamically auto-tuning a gas turbine engine, in accordance with an embodiment of the present invention.

FIG. 20 illustrates a flow diagram of a method 2000 for dynamically auto-tuning a GT engine, in accordance with an embodiment of the present invention. Initially at step 2002, parameters of the GT engine are monitored during operation. The parameters, in one embodiment, quantify combustion dynamics and/or emission composition. At step 2004, it is determined whether the parameters are within predefined upper and lower limits. If any of the monitored parameters are not within predefined limits, they may continue to be monitored, and some other course of action may take place to ensure all parameters are within normal limits. If they are within the normal limits, a first incremental adjustment of the firing temperature of the GT engine is made at step 2006. As used herein, making an incremental adjustment of the firing temperature refers to a controller, such as the Auto-Tune Controller 150 of FIG. 1, adjusting the firing temperature in the control system. In order to actually change the firing temperature, fuel flow to the GT engine may be increased, decreased, or a fuel flow split may be adjusted. As such, making an adjustment to the firing temperature may result in or lead to an adjustment of the fuel flow into the GT engine. This adjustment to the fuel flow is made by the Auto-Tune Controller (e.g., item 150 of FIG. 1).

At step 2008, it is again determined whether the parameters are still within the predefined upper and lower limits. If not, the parameters may continue to be monitored, but a subsequent adjustment to the firing temperate may not occur. In fact, the previous adjustment of the firing temperature may be reversed to allow the parameters to again be within normal limits. If the parameters are still within the predefined upper and lower limits, a second incremental adjustment of the firing temperature is made, shown at step 2010. Again, the second incremental adjustment to the firing temperature refers to an increase or decrease of the firing temperature setting by a controller. If the setting of the firing temperature is to be increased, for instance, the controller may adjust fuel flow into the GT engine in order to affect the change in firing temperature. It is then determined at step 2012 whether the firing temperature can be further increased or decreased, such as in the direction of the previous incremental adjustments. If not, the parameters may continue to be monitored, but further adjustments are not performed. In embodiments, the monitoring of the parameters may discontinue at some point in time. If the firing temperature can further be adjusted, incremental adjustments of the firing temperature are continued at step 2014.

In embodiments, a value associated with the second incremental adjustment of the firing temperature or the last incremental adjustment made is stored in a database such that the value can be later retrieved or accessed and used when similar ambient conditions are present.

The following are exemplary steps involved in performing embodiments of the present invention. These steps include:

1) Evaluate margin of system parameters by analyzing the dynamic signature of the combustor. The auto-tuning system has a combustion dynamic monitoring system that looks at several frequency bands of the combustor signature (e.g., lean blow out). A low frequency band indicates whether the system is running too lean, and the higher frequency band indicates whether the system is running on the rich side (e.g., over firing). In the case of increasing (opening) the IGV angle (e.g., increasing flow of air), it may be confirmed that margin exists for the low band. Increasing mass flow of air would decrease your fuel-air ratio—this drives the combustor to more of a leaner operation. Evaluating the margin before adjusting the IGV angle is a novel approach to adjusting power output of a combustor. More specifically, knowing that power output is increased, analyzing the available margin to determine that there is capacity to increase power output, and subsequently utilizing (but not exceeding) that margin by incrementally adjusting the IGV angle allows for variation of power output. This provides for a way to maximize power output while maintaining emissions and dynamics within limits.

2) Adjust the IGV angle incrementally to a user-defined limit. After each incremental adjustment to the IGV angle, parameters are closely monitored. Exemplary parameters include LBO, CT, LoNX, HT, HHT, HiNX, CO, and LBOtoHT. The first three mentioned parameters, LBO, CT, and LoNX drive lean operation that could lead to the instability of the combustor if these parameters are out of tune. Other parameters may also be monitored during incremental adjustment of the IGV angle, although not listed herein. The IGV angle is adjusted until a user-defined limit is reached (such as defined by the customer), or until a parameters is out of tune. The system continually scans these different parameters. When a parameter is determined to be outside of the predefined upper and lower limits, it can be determined that neither the IGV angle nor the exhaust temperature can be adjusted any further. For example, if the incremental adjustment of the IGV angle is from 84 to 85 degrees without out of tune parameters, then from 85 to 86 degrees without out of tune parameters, then from 86 to 87 degrees, when LBO exceeds the limits, the IGV angle should not be further increased. In this scenario, the IGV angle may be reverted back to 86 degrees, where the parameters were in tune.

3) Store values (including IGV angle and parameters) for future use. For example, next time the customer chooses to invoke the auto-tuning option when ambient conditions are the same or at least similar, that IGV angle reached can be used as a starting point for the IGV angle incremental adjustment.

4) Adjust exhaust temperature once the IGV angle can no longer be adjusted. Increasing exhaust temperature makes the operation richer (more NOx emissions). Parameters are monitored and checked, and once it is determined that there is some margin available (especially high NOx and hot tone), the exhaust temperature can be incrementally adjusted, such as by 3 or 4 degrees at a time, for example, up to a certain predetermined maximum temperature. The parameters monitored here may be termed the combustion and stability frequencies.

IGV angle adjustment may be utilized over exhaust temperature adjustment for maximizing power output of the combustor, mainly because IGV angle adjustment does not affect the life of the hardware of the turbine and produces lower emissions, although adjusting the IGV angle may lead to instability because operations may be too lean. However, adjusting exhaust temperature is used when it is desired to increase power output more so that increased power output can be achieved with IGV adjustment alone or in combination with exhaust temperature. In one embodiment, the adjustment of exhaust temperature occurs without IGV angle adjustment.

When exhaust temperature of the GT engine is adjusted, the firing temperature within the combustor itself is also affected. The firing temperature is too high to measure, and as such the exhaust temperature is measured so that the firing temperature can be back calculated. The exhaust temperature is adjusted or biased by raising the firing temperature inside the combustor. There are operation curves that are consulted to determine how to adjust the firing temperature to affect the exhaust temperature.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. One or more computer-readable media that, when invoked by computer-executable instructions, perform a method for dynamically auto-tuning a gas turbine engine, the method comprising:
monitoring one or more parameters of the gas turbine engine during operation at a stable operating point within predetermined upper and lower limits;
determining that the one or more monitored parameters of the gas turbine engine are within the predetermined upper and lower limits such that a margin exists for the one or more monitored parameters;
while maintaining the gas turbine engine at a plurality of stable operating points within the predetermined upper and lower limits:
(1) performing a first incremental adjustment of an inlet guide vane (IGV) angle of the gas turbine engine;
(2) upon performing the first incremental adjustment of the IGV angle, determining that the one or more monitored parameters of the gas turbine engine are still within the predetermined upper and lower limits;
(3) performing a second incremental adjustment of the IGV angle of the gas turbine engine;
(4) upon performing the second incremental adjustment of the IGV angle, determining that the one or more monitored parameters of the gas turbine engine are still within the predetermined upper and lower limits; and
determining that a predetermined value of the IGV angle has been reached such that the IGV angle is not to be further increased or decreased.

2. The one or more computer-readable media of claim 1, wherein the one or more parameters are associated with at least one of combustion dynamics or emission composition.

3. The one or more computer-readable media of claim 1, further comprising storing a value associated with the second incremental adjustment of the IGV angle of the gas turbine engine such that the value can be accessed and used for similar ambient conditions.

4. The one or more computer-readable media of claim 1, wherein the IGV angle is increased to increase power output of the gas turbine engine.

5. The one or more computer-readable media of claim 1, wherein the IGV angle is decreased to decrease power output of the gas turbine engine.

6. The one or more computer-readable media of claim 1, further comprising:
performing a third incremental adjustment of the IGV angle of the gas turbine engine; and
upon performing the third incremental adjustment of the IGV angle, determining that the one or more monitored parameters of the gas turbine engine are still within the predetermined upper and lower limits.

7. The one or more computer-readable media of claim 1, wherein at least one of the first incremental adjustment or the second incremental adjustment of the IGV angle increases the IGV angle such that a flow of air is increased.

8. The one or more computer-readable media of claim 1, wherein increasing the flow of air decreases a fuel-air ratio in the gas turbine engine.

9. The one or more computer-readable media of claim 1, wherein at least one of the first incremental adjustment or the second incremental adjustment of the IGV angle decreases the IGV angle such that a flow of air is decreased.

10. The one or more computer-readable media of claim 1, wherein adjusting the IGV angle of the gas turbine engine while monitoring the one or more parameters of the gas turbine engine allows for maximization of power output of the gas turbine engine while maintaining emissions and dynamics of the gas turbine engine within acceptable limits.

11. The one or more computer-readable media of claim 1, wherein the one or more monitored parameters include at least one of lean blowout, cold tone, low NOx, hot tone, high hot tone, high NOx, carbon monoxide, and a ratio of the lean blowout to the hot tone.

12. One or more computer-readable media that, when invoked by computer-executable instructions, perform a method for dynamically auto-tuning a gas turbine engine, the method comprising:
monitoring one or more parameters of the gas turbine engine during operation at a stable operating point within predetermined upper and lower limits;
determining that the one or more monitored parameters of the gas turbine engine are within the predetermined upper and lower limits;
while maintaining the gas turbine engine at a plurality of stable operating points within the predetermined upper and lower limits:
(1) making a first incremental adjustment of an exhaust temperature of the gas turbine engine, wherein adjusting the exhaust temperature results in an adjustment of fuel flow into the gas turbine engine;
(2) upon making the first incremental adjustment of the exhaust temperature, determining that the one or more monitored parameters of the gas turbine engine are still within the predetermined upper and lower limits;
(3) making a second incremental adjustment of the exhaust temperature;
(4) upon making the second incremental adjustment of the exhaust temperature, determining that the one or more monitored parameters of the gas turbine engine are still within the predetermined upper and lower limits; and
determining that a predetermined value of the exhaust temperature has been reached such that the exhaust temperature is not to be further increased or decreased.

13. The one or more computer-readable media of claim 12, further comprising storing a value associated with the second incremental adjustment of the exhaust temperature of the gas turbine engine such that the value can be accessed and used for similar ambient conditions.

14. The one or more computer-readable media of claim 12, wherein the parameters quantify at least one of combustion dynamics or emission composition.

15. One or more computer-readable media that, when invoked by computer-executable instructions, perform a method for dynamically auto-tuning a gas turbine engine, the method comprising:
monitoring parameters of the gas turbine engine during operation at a stable operating point within predetermined upper and lower limits, wherein the parameters quantify at least one of combustion dynamics or emission composition;
determining that the monitored parameters of the gas turbine engine are within the predetermined upper and lower limits such that margin exists for the monitored parameters;
while maintaining the gas turbine engine at a plurality of stable operating points within the predetermined upper and lower limits:
(1) performing at least one incremental adjustment of an inlet guide vane (IGV) angle of the gas turbine engine;
(2) upon performing the at least one incremental adjustment of the IGV angle, determining that at least one of the monitored parameters of the gas turbine engine is outside of predefined upper and lower limits or that a predetermined value of the IGV angle has been reached;
(3) determining that the margin still exists for the monitored parameters;
(4) upon determining that the margin still exists for the monitored parameters, making at least one incremental adjustment of an exhaust temperature of the gas turbine engine, wherein adjusting the exhaust temperature results in an adjustment of fuel flow into the gas turbine engine; and
upon at least one of the monitored parameters being outside of the predefined upper and lower limits or when the exhaust temperature has reached a value that is not to be either further increased or decreased, discontinuing the incremental adjustment of the exhaust temperature.

16. The one or more computer-readable media of claim 15, wherein the margin exists for the monitored parameters when it is determined that the one or more monitored parameters are within the predefined upper and lower limits.

17. The one or more computer-readable media of claim 15, wherein when the predetermined value of the IGV angle has been reached, the IGV angle is not to be either further increased or decreased.

18. The one or more computer-readable media of claim 15, wherein determining that the margin still exists for the monitored parameters further comprises determining that a difference between a current value of any of the monitored parameters and a value of an upper limit or a lower limit for a respective monitored parameter is greater than a predetermined threshold value.

19. The one or more computer-readable media of claim 15, wherein adjusting the exhaust temperature is accomplished by adjusting fuel flow into the gas turbine engine.

20. The one or more computer-readable media of claim 15, wherein the IGV angle is increased to increase power output of the gas turbine engine or is decreased if one or more of the parameters of the gas turbine engine are out of tune.

21. One or more computer-readable media that, when invoked by computer-executable instructions, perform a method for dynamically auto-tuning a gas turbine engine, the method comprising:

- monitoring one or more parameters of the gas turbine engine during operation at a stable operating point within predetermined upper and lower limits;
- determining that the one or more monitored parameters of the gas turbine engine are within the predetermined upper and lower limits;
- while maintaining the gas turbine engine at a plurality of stable operating points within the predetermined upper and lower limits:
  (1) making a first incremental adjustment of a firing temperature of the gas turbine engine, wherein adjusting the firing temperature results in an adjustment of fuel flow into the gas turbine engine;
  (2) upon making the first incremental adjustment of the firing temperature, determining that the one or more monitored parameters of the gas turbine engine are still within the predetermined upper and lower limits;
  (3) making a second incremental adjustment of the firing temperature;
  (4) upon making the second incremental adjustment of the firing temperature, determining that the one or more monitored parameters of the gas turbine engine are still within the predetermined upper and lower limits; and
- determining that a predetermined value of the firing temperature has been reached such that the firing temperature is not to be further increased or decreased.

* * * * *